US012159592B2

(12) United States Patent
Moon et al.

(10) Patent No.: US 12,159,592 B2
(45) Date of Patent: *Dec. 3, 2024

(54) DISPLAY DEVICE AND DRIVING METHOD THEREOF

(71) Applicant: LG Display Co., Ltd., Seoul (KR)

(72) Inventors: Myung Kook Moon, Paju-si (KR); Hae Jong Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,364

(22) Filed: May 9, 2023

(65) Prior Publication Data

US 2023/0274707 A1 Aug. 31, 2023

Related U.S. Application Data

(63) Continuation of application No. 17/527,733, filed on Nov. 16, 2021, now Pat. No. 11,688,353.

(30) Foreign Application Priority Data

Nov. 19, 2020 (KR) ........................ 10-2020-0155420

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2310/0278* (2013.01); *G09G 2310/061* (2013.01); *G09G 2310/08* (2013.01)

(58) Field of Classification Search
CPC ............... G09G 3/3291; G09G 3/3266; G09G 2310/0278; G09G 2310/061; G09G 2310/08
See application file for complete search history.

(56) References Cited

U.S. PATENT DOCUMENTS

| | | | | |
|---|---|---|---|---|
| 9,934,750 B2 | 4/2018 | Park et al. | | |
| 10,916,198 B2 | 2/2021 | Lin et al. | | |
| 11,688,353 B2 * | 6/2023 | Moon | G09G 3/3233 | 345/204 |
| 2011/0057914 A1 * | 3/2011 | Nam | G09G 3/3648 | 345/211 |
| 2015/0371609 A1 | 12/2015 | Choi et al. | | |
| 2017/0047028 A1 * | 2/2017 | Seo | G09G 3/3614 | |
| 2017/0069256 A1 | 3/2017 | Seo et al. | | |
| 2017/0092192 A1 * | 3/2017 | Lin | G09G 3/3258 | |
| 2019/0057646 A1 * | 2/2019 | Lin | G09G 3/3233 | |
| 2019/0362679 A1 | 11/2019 | Pyo et al. | | |

(Continued)

FOREIGN PATENT DOCUMENTS

| | | |
|---|---|---|
| CN | 111435587 A | 7/2020 |
| KR | 20150100978 A | 9/2015 |
| KR | 20200056096 A | 5/2020 |

*Primary Examiner* — Lixi C Simpson
(74) *Attorney, Agent, or Firm* — Seed IP Law Group LLP

(57) ABSTRACT

The present disclosure relates to a display device and a driving method thereof, wherein a refresh rate of pixels is controlled at a reference frame frequency in a normal driving mode, and the refresh rate of the pixels is controlled at a frequency lower than the reference frame frequency in a low speed driving mode. In the low speed driving mode, park data is transmitted to a data driving circuit during at least one vertical blank period.

15 Claims, 19 Drawing Sheets

(56) References Cited

U.S. PATENT DOCUMENTS

| | | | |
|---|---|---|---|
| 2020/0066215 | A1 | 2/2020 | Koo et al. |
| 2020/0211475 | A1 | 7/2020 | Park et al. |
| 2020/0226978 | A1 | 7/2020 | Lin et al. |

* cited by examiner

DISPLAY DEVICE AND DRIVING METHOD THEREOF

CROSS-REFERENCE TO RELATED APPLICATION

This application is a continuation of U.S. patent application Ser. No. 17/527,733, filed May 5, 2022, which claims the benefit of Korean Patent Application No. 10-2020-0155420, filed Nov. 19, 2020, the disclosure of which is incorporated herein by reference in its entirety.

BACKGROUND

Technical Field

The present disclosure relates to a display device and a driving method thereof.

Description of the Related Art

An electroluminescent display device is roughly classified into an inorganic light emitting display device and an organic light emitting display device depending on the material of a light emitting layer. The organic light emitting display device of an active matrix type includes an Organic Light Emitting Diode (hereinafter referred to as "OLED") that emits light by itself. Accordingly, there are advantages that the response speed is fast, and the luminous efficiency, luminous and viewing angle are large. Further, in the organic light emitting display device, the light emitting diode is formed on each of the pixels. Thus, the organic light emitting display device has a high response speed, excellent luminous efficiency, luminous, viewing angle, and the like, and is capable of expressing black gradation in complete black, thereby providing excellent contrast ratio and color reproduction.

The organic light emitting display device does not require a backlight unit, and may be implemented on a plastic substrate, which is a flexible material, a thin glass substrate, or a metal substrate. Therefore, a flexible display may be implemented as an organic light emitting display device.

BRIEF SUMMARY

The present disclosure provides a display device capable of improving image quality in a low speed driving mode and a driving method thereof.

It should be noted that technical benefits of the present disclosure are not limited to the above-described benefits, and other benefits of the present disclosure will be apparent to those skilled in the art from the following descriptions.

According to an aspect of the present disclosure, there is provided a display device including: a pixel array in which a plurality of data lines, a plurality of gate lines overlapping the data lines, and a plurality of pixels are arranged; a data driving circuit configured to convert pixel data to a data voltage and convert park data to a park voltage; a gate driving circuit configured to sequentially supply gate signals to the respective gate lines; and a timing controller configured to control a refresh rate of the pixels at a reference frame frequency in a normal driving mode and the refresh rate of the pixels at a frequency lower than the reference frame frequency in a low speed driving mode, and to transmit the park data to the data driving circuit during at least one vertical blank period in the low speed driving mode.

According to another aspect of the present disclosure, there is provided a method of driving a display device including: controlling a refresh rate of pixels at a reference frame frequency in a normal driving mode; controlling a refresh rate of the pixels at a frequency lower than the reference frame frequency in a low speed driving mode; transmitting the park data to a data driving circuit during at least one vertical blank period in the low speed driving mode; and converting the pixel data to a data voltage and converting the park data to a park voltage in the data driving circuit.

According to the present disclosure, the park data generated from the timing controller during the vertical blank period of the low speed driving mode may be transmitted to the data driving circuit, and the park voltage obtained in the data driving circuit may be applied to the data lines of the display panel, thereby improving image quality in the low speed driving mode.

According to the present disclosure, since the park data is transmitted from the timing controller to the data driving circuit, a circuit for switching the data voltage and the park voltage is not required in the data driving circuit. Accordingly, the channel outputting the park voltage from the power supply circuit and the switch element for switching the park voltage may be removed from the data driving circuit.

According to the present disclosure, the park voltage may be varied according to the pixel position of the pixel array and the frame frequency of the low speed driving mode, and the park voltage may be adjusted in units of pixels, lines, or frames.

According to the present disclosure, the park voltage may be applied differently according to the scanning order of the pixel array.

According to the present disclosure, the pixel data distribution characteristics of an input image, a pixel location to which a park voltage is applied, and an amount of deterioration of the pixels may be analyzed, thereby automatically adjusting an optimal park voltage.

Further, according to the present disclosure, a phenomenon in which the control node controlling the scan signal is undesirably discharged or decayed may be prevented, so that image quality may be improved by preventing flicker in the low speed driving mode.

Effects of the present disclosure are not limited to the above-described effects, and other effects which are not mentioned can be apparently understood by those skilled in the art from a disclosure of claims.

BRIEF DESCRIPTION OF THE SEVERAL VIEWS OF THE DRAWINGS

The above and other features, and advantages of the present disclosure will become more apparent to those of ordinary skill in the art by describing embodiments thereof in detail with reference to the attached drawings, in which.

DETAILED DESCRIPTION

Figure 1:
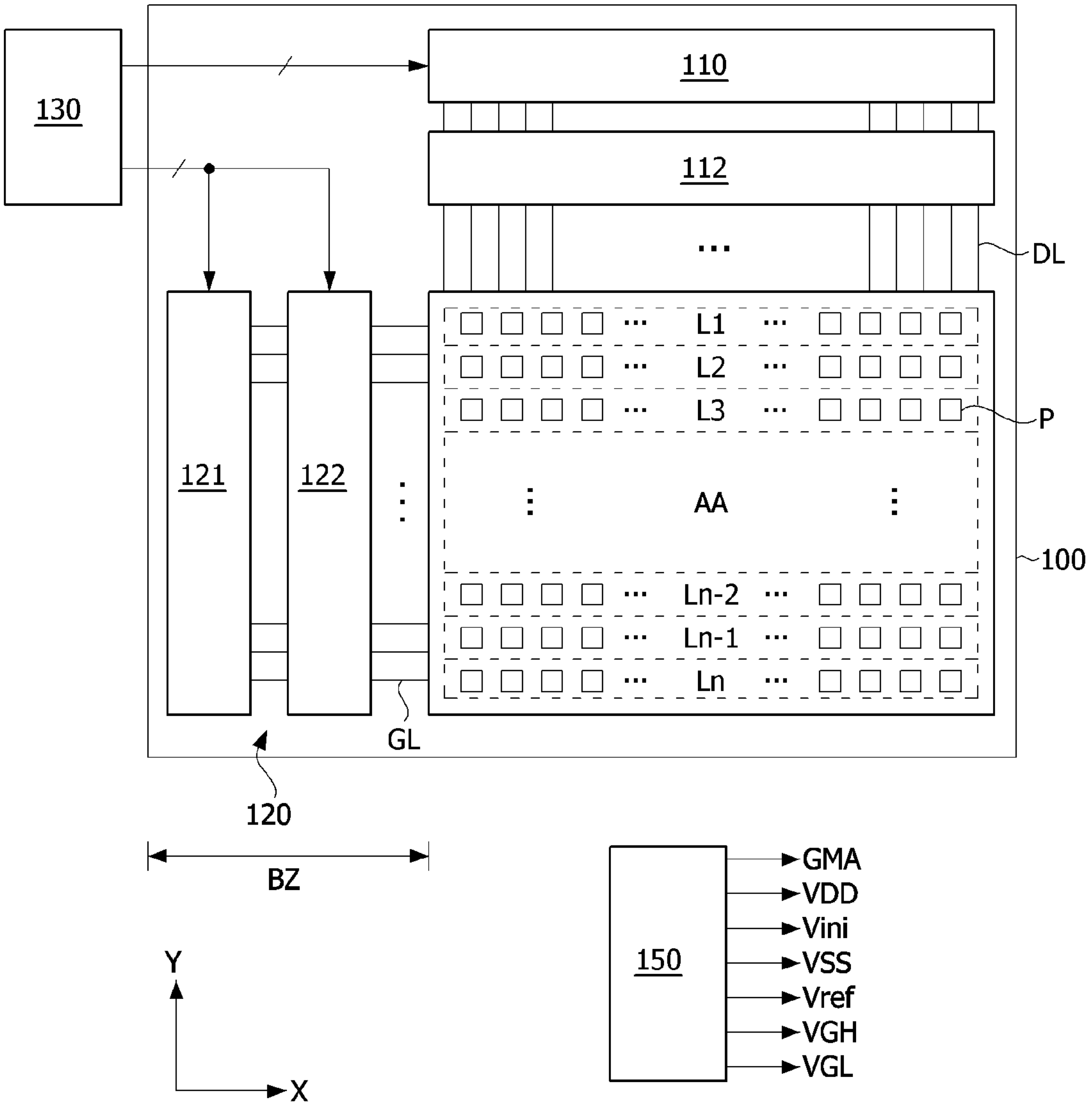
FIGS. 1 and 2 are block diagrams showing a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “consist of” used herein are generally intended to allow other components to be added unless the terms are used with the term “only.” Any references to singular may include plural unless expressly stated otherwise.

Components are interpreted to include an ordinary error range even if not expressly stated.

When the position relation between two components is described using the terms such as “on,” “above,” “below,” and “next,” one or more components may be positioned between the two components unless the terms are used with the term “immediately” or “directly.”

The terms “first,” “second,” and the like may be used to distinguish components from each other, but the functions or structures of the components are not limited by ordinal numbers or component names in front of the components.

The term “unit” may include any electrical circuitry, features, components, an assembly of electronic components or the like. That is, “unit” may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term “unit.”

In some embodiments, the various units described herein may be included in or otherwise implemented by processing circuitry such as a microprocessor, microcontroller, or the like.

The same reference numerals refer to the same elements throughout the description.

The following embodiments can be partially or entirely bonded to or combined with each other and can be linked and operated in technically various ways. The embodiments can be carried out independently of or in association with each other.

In the display device of the present disclosure, the pixel circuit may include a plurality of transistors. The transistors may be implemented as oxide thin film transistors (TFTs) including an oxide semiconductor, LTPS TFTs including low temperature polysilicon (LTPS), or the like. Each of the transistors may be implemented as a p-channel TFT or an n-channel TFT. In the description of embodiments, the transistors of the pixel circuit are described based on an example in which the transistors of the pixel circuit are implemented as p-channel TFTs, but the present disclosure is not limited thereto.

The transistor is a three-electrode element including a gate, a source, and a drain. The source is an electrode which supplies carriers to the transistor. In the transistor, the carriers start flowing from the source. The drain is an electrode through which the carriers exit from the transistor. In the transistor, the carriers flow from the source to the drain. In the case of the n-channel transistor (NMOS), since the carriers are electrons, a source voltage is lower than a drain voltage so that the electrons may flow from the source to the drain. In the case of the n-channel transistor, current flows in a direction from the drain to the source. In the case of the p-channel transistor (PMOS), since the carriers are holes, a source voltage is higher than a drain voltage so that the holes may flow from the source to the drain. In the p-channel transistor, since the holes flow from the source to the drain, current flows from the source to the drain. It should be noted that the source and drain of the transistor are not fixed. For example, the source and drain may be changed according to the applied voltage. Accordingly, the disclosure is not limited due to the source and drain of the transistor. In the following description, the source and drain of the transistor will be referred to as first and second electrodes.

The gate signal swings between the gate-on voltage and the gate-off voltage. The gate-on voltage is set to a voltage higher than the threshold voltage of the transistor, and the gate-off voltage is set to a voltage lower than the threshold voltage of the transistor. The transistor is turned on in response to the gate-on voltage, and is turned off in response to the gate-off voltage. In the case of the n-channel transistor, the gate-on voltage may be a gate high voltage VGH/VEH and the gate-off voltage may be a gate low voltage VGL/VEL. In the case of the p-channel transistor, the gate-on voltage may be the gate low voltage VGL/VEL, and the gate-off voltage may be the gate high voltage VGH/VEH.

Hereinafter, various embodiments of the present disclosure will be described in detail with reference to the accompanying drawings.

Figure 2:
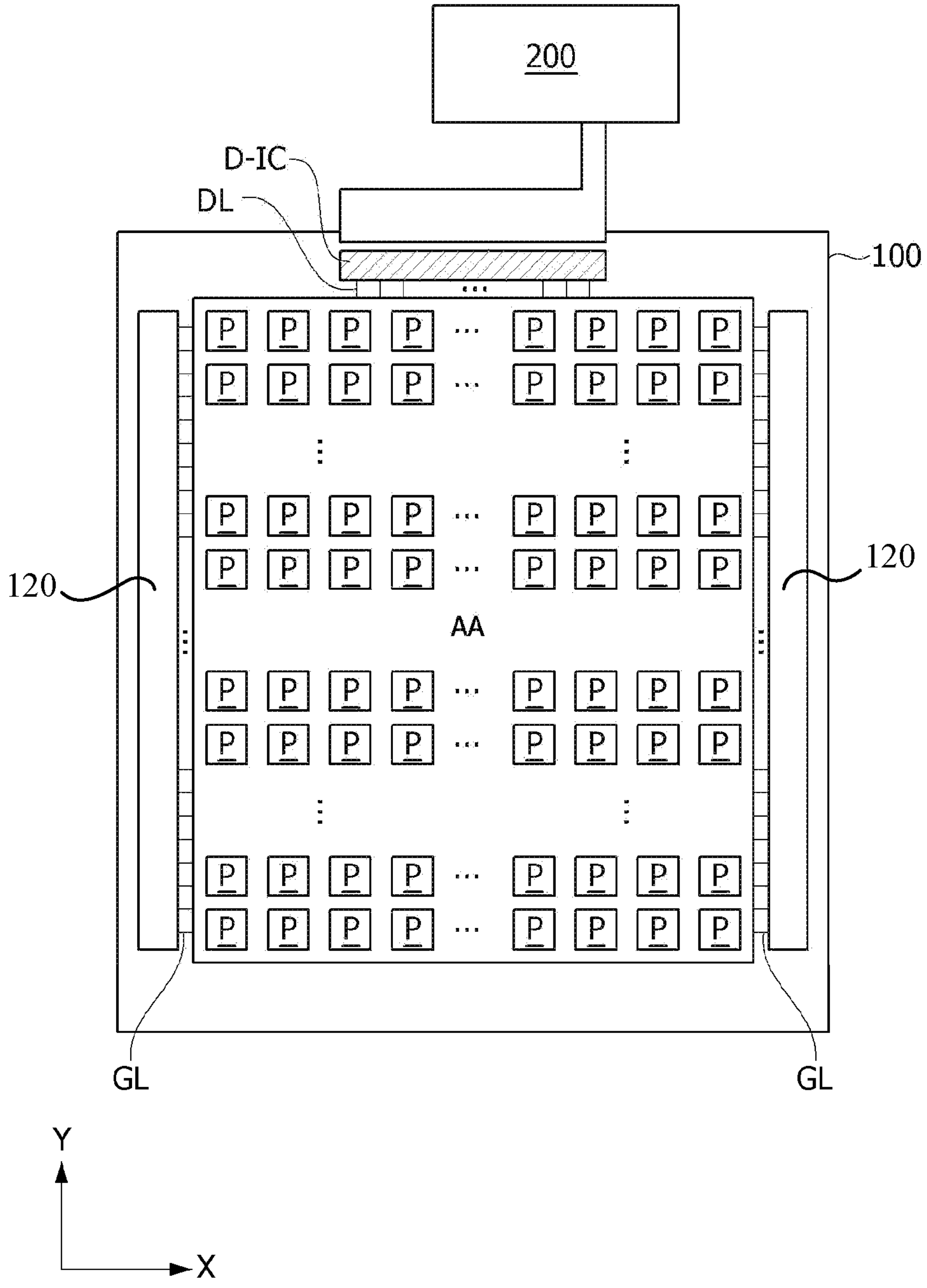

FIG. 1 is a block diagram showing a display device according to an embodiment of the present disclosure. FIG. 2 is a diagram schematically showing some pixels and wirings of a pixel array. In FIG. 2, power lines are omitted.

Referring to FIGS. 1 and 2, a display device according to an embodiment of the present disclosure includes a display panel 100 and a display panel driver for writing pixel data of an input image to pixels of the display panel 100.

The display panel 100 includes a pixel array AA that displays an input image on a screen. The pixel array AA includes a plurality of data lines DL, a plurality of gate lines GL overlapping with the data lines DL, pixels P arranged in a matrix form defined by the data lines DL and the gate lines GL.

Each of the pixels P may be divided into a red sub-pixel, a green sub-pixel, and a blue sub-pixel for color implementation. Each of the pixels may further include a white sub-pixel. Each of the sub-pixels includes a pixel circuit driving a light emitting element OLED. The pixel circuit includes a light emitting element OLED, a driving element that drives the light emitting element OLED by controlling the current flowing through the light emitting element OLED according to a gate-source voltage Vgs, a storage capacitor that maintains a gate voltage of the driving element, and the like. The driving element may be implemented as a transistor.

The sub-pixels may include a color filter, but may be omitted. Hereinafter, the pixel may be interpreted as having the same meaning as a sub-pixel.

The pixel array AA includes a plurality of pixel lines L1 to Ln. The pixel line includes pixels arranged on one line disposed along a row line direction (X-axis direction). When the resolution of the pixel array is m*n, the pixel array includes n pixel lines L1 to L(N). The pixels arranged on one-pixel line share gate lines and are connected to different data lines DL. The sub-pixels arranged vertically along the column direction (Y-axis direction) share the same data line.

A data voltage of one-line data is charged to the pixels of one-pixel line during one-horizontal period 1H, so that pixel data is written to the pixels of one-pixel line. During one-frame period, the pixel data is written to all of the pixel lines L1 to Ln of the pixel array AA.

Touch sensors may be disposed on the screen of the display panel 100. The touch sensors may be implemented as In-cell type touch sensors that are disposed on the screen of the display panel in an On-cell type or an Add-on type, or embedded in a pixel array.

The display panel 100 may be implemented as a flexible display panel in which pixels are arranged on a flexible substrate such as a plastic substrate or a metal substrate. In the flexible display, the size and shape of the screen may be varied by winding, folding, and bending the flexible display panel. The flexible display may include a slideable display, a rollable display, a bendable display, a foldable display, and the like.

Due to the process deviation and device characteristic deviation caused in the manufacturing process of the display panel, there may be a difference in electrical characteristics of the driving element between pixels, and this difference may increase over the lapse of driving time of the pixels. In order to compensate for the electrical characteristic deviation of the driving element between pixels, an internal compensation technology or an external compensation technology may be applied to the organic light emitting display device.

In the internal compensation technology, a threshold voltage of a driving element is sensed for each sub-pixel using an internal compensation circuit embedded in each of the pixels, and the gate-source voltage Vgs of the driving element is compensated by the threshold voltage. The external compensation technology uses an external compensation circuit to sense a current or voltage of a driving element that changes according to electrical characteristics of the driving elements in real time. The external compensation technology modulates pixel data (digital data) of an input image as much as the electrical characteristic deviation (or variation) of the driving element sensed for each pixel, thereby compensating the electrical characteristic deviation (or variation) of the driving element in each of the pixels in real time.

The display panel driver may drive pixels by applying an internal compensation technology and/or an external compensation technology. Hereinafter, the pixel circuit and the display panel driver will be described based on an example in which the internal compensation technology is applied, but the present disclosure is not limited thereto.

The display panel driver reproduces the input image on the pixel array AA of the display panel 100 by writing pixel data of the input image into sub-pixels. The display panel driver includes a data driving unit 110, a gate driving unit 120, and a timing controller 130. The display panel driver may further include a demultiplexer 112 disposed between the data driving unit 110 and the data lines DL. In addition, the display panel driver may further include a touch sensor driving unit. The touch sensor driving unit drives the touch sensors, compares the output signals of the touch sensors with a preset (or selected) threshold value to determine a touch input, and transmits coordinate data of the touch input to a host system.

The display panel driver may operate in a low speed driving mode. The low-speed driving mode may analyze an input image to reduce power consumption of the display device when the input image is not varied as much as a preset (or selected) time or a touch input is not occurred for a predetermined (or selected) time or longer. In the low speed driving mode, when a still image is input for a certain time or longer, a refresh rate of the pixels may be lowered, thereby controlling a period of writing data of the pixels to a long time, thereby reducing power consumption.

The refresh rate may be different from the frame frequency transmitted from the host system 200 to the timing controller 130. The refresh rate is a pixel driving frequency at which new pixel data is written to the pixels. In the case of the normal driving mode, the pixels may be driven at the refresh rate equal to a reference frame frequency. The reference frame frequency may be preset (or selected) as an input frame frequency from the host system 200 or a driving frequency of pixels in the normal driving mode. In the case of the low speed driving mode, data may be written to the pixels at a frequency lower than the input frame frequency from the host system 200 or the reference frame frequency. In the low speed driving mode, the timing controller may transmit pixel data to the data driving unit 110 during a frame period of the frame frequency lower than the input frame frequency or the reference frame frequency. Thus, since the pixels are driven at a refresh rate lower than the input frame frequency or the reference frame frequency in the low speed driving mode, the power consumption in the data driving unit 110, the gate driving unit 120, and the pixels P is reduced.

The low speed driving mode is not limited when a still image is input. For example, when the display device operates in a standby mode or when a user command or an input image is not input to the display panel driver for a predetermined (or selected) time or longer, the display panel driver may be operated in the low speed driving mode.

The data driving unit 110 converts data received from the timing controller 130 into a gamma compensation voltage using a digital to analog converter (hereinafter referred to as "DAC") to generate a data voltage Vdata. The data may include pixel data and park data of the input image. The gamma compensation voltage is output from a voltage dividing circuit that divides a gamma reference voltage GMA to generate a voltage for each gray level, and is input to the DAC. The data voltage Vdata may be supplied to the data lines DL of the display panel 100 through the demultiplexer 112.

The data driving unit 110 converts the park data input from the timing controller 130 into a gamma compensation voltage during a vertical blank period in the low speed driving mode and outputs a park voltage Vpark. The park voltage Vpark is applied to the pixels through the data line during the vertical blank period in the low speed driving mode. The park voltage Vpark has a voltage level corresponding to data value of the park data. Thus, the timing controller 130 may vary the park voltage Vpark applied to the pixels as park data transmitted to the data driving unit 110 in units of sub-pixels, units of pixels, units of pixel lines, or units of frames.

The demultiplexer 112 time-divisions and distributes the data voltage Vdata output through one channel of the data driving unit 110 to the plurality of data lines DL. In virtue of the demultiplexer 112, the number of channels of the data driving unit 110 may be reduced.

The gate driving unit 120 may sequentially scan the pixel lines by sequentially applying a gate signal to the pixel lines of the display panel 100. The pixels of the pixel lines charge the data voltage Vdata synchronized with the gate signal when the gate signal is applied.

The gate driving unit 120 may be implemented as a Gate in panel (GIP) circuit formed directly on a bezel region BZ on the display panel 100 together with a TFT array of a pixel array. The gate driving unit 120 outputs a gate signal to the gate lines GL under the control of the timing controller 130. The gate driving unit 120 may shift the gate signal using a shift register and sequentially supply the shifted signal to the gate lines GL. The voltage of the gate signal swings between a gate-off voltage VGH/VEH and a gate-on voltage VGL/VEL. The gate signal includes a scan signal and a light emitting control signal (hereinafter, referred to as "EM signal") for controlling light emitting times of the pixels. The gate lines may be divided into scan lines to which a scan signal is applied and EM lines (or light emitting control lines) to which an EM signal is applied.

The gate driving unit 120 may be disposed on each of the left and right bezels of the display panel 100 to supply a gate signal to the gate lines GL in a double feeding method. In the double feeding method, the gate driving units 120 on both sides are synchronized so that the gate signals may be simultaneously applied at both ends of one gate line. In another embodiment, the gate driving unit 120 may be disposed on either side of the left or right bezel of the display panel 100 to supply the gate signal to the gate lines GL in a single feeding method.

The gate driving unit 120 may include a first gate driving unit 121 and a second gate driving unit 122. The first gate driving unit 121 outputs a pulse of the scan signal and shifts the pulse of the scan signal according to a shift clock. The second gate driving unit 122 outputs the pulse of the EM signal and shifts the pulse of the EM signal according to the shift clock. In the case of a model without a bezel, at least some of the switch elements constituting the first and second gate driving units 121 and 122 may be separately disposed in the pixel array.

The timing controller 130 controls the refresh rate of the pixels P at the reference frame frequency in the normal driving mode. In addition, the timing controller 130 controls the refresh rate of the pixels P at a frequency lower than the reference frame frequency in the low speed driving mode. The timing controller 130 may transmit the park data to the data driving unit during at least one vertical blank period in the low speed driving mode.

The timing controller 130 transmits pixel data to the data driving unit 110 at a reference frame frequency in the normal driving mode. The timing controller 130 transmits pixel data to the data driving unit at a refresh rate lower than the reference frame frequency in the low speed driving mode, and transmits the park data to the data driving unit during at least one vertical blank period in the low speed driving mode. The data driving unit 110 converts the pixel data into a data voltage and converts the park data into a park voltage.

The timing controller 130 receives pixel data of an input image and a timing signal synchronized with the pixel data from the host system. The timing signal includes a vertical synchronization signal Vsync, a horizontal synchronization signal Hsync, a clock CLK, a data enable signal DE and the like. One period of the vertical synchronization signal Vsync is one frame period. One period of the horizontal synchronization signal Hsync and the data enable signal DE is one horizontal period 1H. The pulse of the data enable signal DE is synchronized with one-line data to be written to the pixels of one-pixel line. Since the frame period and the horizontal period may be known by counting the data enable signal DE, the vertical synchronization signal Vsync and the horizontal synchronization signal Hsync may be omitted.

The host system may be a main circuit board of a Television (TV) system, a set-top box, a navigation system, a personal computer (PC), a vehicle system, a home theater system, a mobile device, or a wearable device. In the mobile device or the wearable device, the timing controller 130, the data driving unit 110, and the power supply unit 150 may be integrated into one drive IC (D-IC) as shown in FIG. 2. The host system may respond to coordinate data of a touch input inputted from the touch sensor driving unit and execute an application or process data corresponding to the touch input. In FIG. 2, the reference numeral "200" denotes a host system. In a mobile device, the host system may be implemented as an application processor (AP).

The timing controller 130 may multiply the input frame frequency by i times and control the operation timing of the display panel drivers 110, 112, and 120 at a frame frequency of the input frame frequency×i Hz (i is a positive integer greater than 0). The input frame frequency is 60 Hz in the National Television Standards Committee (NTSC) system and 50 Hz in the Phase-Alternating Line (PAL) system. The timing controller 130 or the host system 200 may lower the frame frequency to a frequency between 1 Hz and 30 Hz in order to lower the refresh rate of pixels in the low speed driving mode.

The timing controller 130 generates a data timing control signal for controlling the operation timing of the data driving unit 110, a MUX signal for controlling the operation timing of the demultiplexer 112, and a gate timing control signal for controlling the operation timing of the gate driving unit 120, based on the timing signals Vsync, Hsync, and DE received from the host system.

The gate timing control signal may include a start pulse, a shift clock, or the like. A voltage level of the gate timing control signal output from the timing controller 130 may be converted into a gate-off voltage VGH/VEH and a gate-on voltage VGL/VEL through a level shifter (not shown) to be supplied to the gate driving unit 120. The level shifter may convert a low level voltage of the gate timing control signal into the gate-on voltage VGL, and a high level voltage of the gate timing control signal into the gate-off voltage VGH.

The power supply unit 150 may include a charge pump, a regulator, a buck converter, a boost converter, and the like. The power supply unit 150 generates power for driving the display panel driver and the display panel 100 by adjusting the DC input voltage from the host system. The power supply unit 150 may output DC voltages such as a gamma reference voltage GMA, the gate-off voltage VGH/VEH, the gate-on voltage VGL/VEL, a pixel driving voltage VDD, a low-potential power supply voltage VSS, an initialization voltage Vini, and a reference voltage Vref. The gamma reference voltage GMA is supplied to the data driving unit 110. The gate-off voltage VGH/VEH and the gate-on voltage VGL/VEL are supplied to the gate driving unit 120. The pixel driving voltage VDD, the low-potential power supply voltage VSS, the initialization voltage Vini, and the reference voltage Vref are commonly supplied to pixel circuits through power lines omitted in FIG. 2. The pixel driving voltage VDD is set to a voltage higher than the low-potential power supply voltage VSS, the initialization voltage Vini, and the reference voltage Vref.

Figure 3:
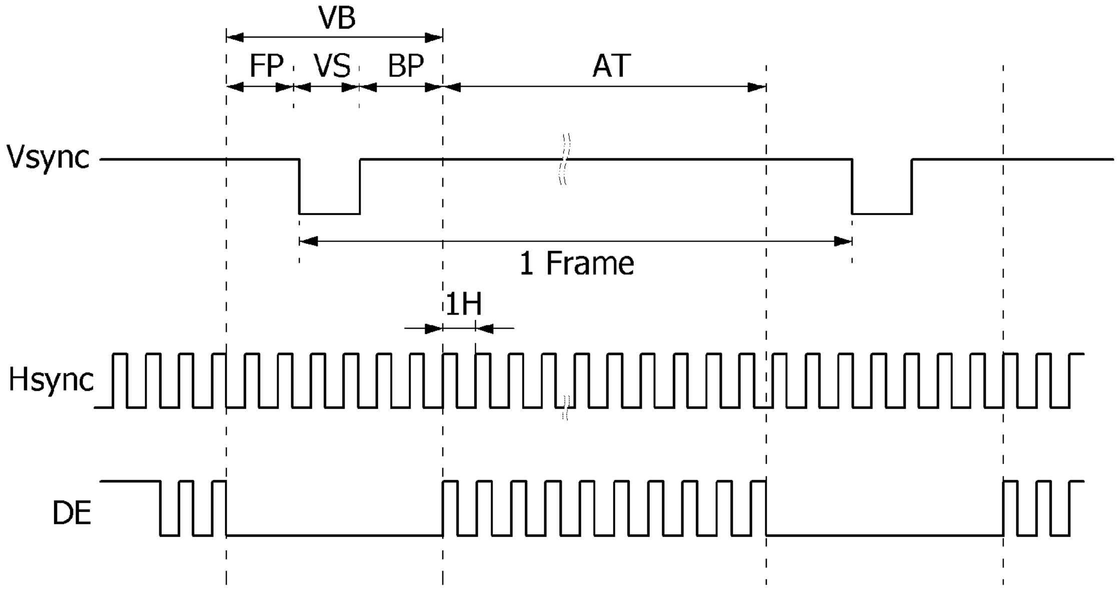
FIG. 3 is a diagram showing 1 frame period.

FIG. 3 is a diagram showing 1 frame period. In FIG. 3, a vertical synchronization signal Vsync, a horizontal synchronization signal Vsync, and a data enable signal DE are timing signals synchronized with pixel data of an input image.

Referring to FIG. 3, one (1) frame period (one Frame) is divided into an active interval AT in which pixel data of an input image is written to pixels, and a vertical blank period VB without the pixel data.

The vertical blank period VB is a blank period in which the pixel data is not received in the timing controller 130 between the active interval AT of the N−1th frame period and the active interval AT of the Nth frame period (N is a natural number). The vertical blank period VB includes a vertical sync time VS, a vertical front porch FP, and a vertical back porch BP.

The vertical synchronization signal Vsync defines one frame period. One pulse period of the horizontal synchronization signal Hsync and the data enable signal DE is one horizontal period 1H. The data enable signal DE defines an effective data section including pixel data to be written to the pixels during the active interval AT. The pulse of the data enable signal DE is synchronized with the pixel data of one line to be written to pixels of one-pixel line of the display panel 100.

The timing controller 130 may transmit data together with a clock to the data driving unit 110 through the same wiring. For example, the clock and data generated by the timing controller 130 may be encoded in a data format defined in an Embedded Clock Point to Point Interface (EPI) interface protocol and transmitted to the data driving unit 110.

In the EPI interface, the data driving unit 110 multiplies a clock inputted from the timing controller 130 and recoveries the clock to generate an internal clock for sampling data. The timing controller 130 transmits a preamble clock or a clock training pattern clock to the data driving unit 110 so that the phase of the recovered clock in the data driving unit 110 may be locked.

In the EPI interface protocol, the timing controller 130 may transmit data and clock to the data driving unit 110 during the vertical blank period VB between frame periods and during the horizontal blank period HB between one-line data. The data driving unit 110 recoveries the clock received from the timing controller 130 by performing a clock training operation based on the preamble clock to generate an internal clock for data sampling. The data driving unit 110 samples and latches data received from the timing controller 130 according to the internal clock timing, and converts the data into a data voltage through a DAC.

Figure 4:
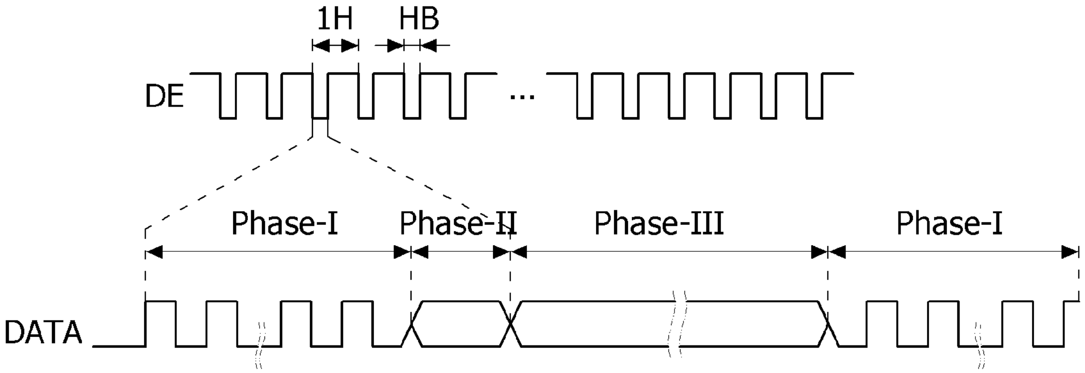
FIG. 4 is a diagram illustrating an example of data transmitted from a timing controller to a data driving unit during an active interval of 1 frame period.

FIG. 4 is a diagram illustrating an example of data transmitted from a timing controller 130 to a data driving unit 110 during an active interval AT of 1 frame period. FIG. 4 shows a data transmission method defined in the EPI interface protocol.

Referring to FIG. 4, the timing controller 130 may transmit signals defined in a first phase Phase-I, a second phase Phase-II, and a third phase Phase-III for every horizontal period to the data driving unit 110 during an active interval AT for every frame period. During one horizontal period 1H, signals for the first phase Phase-I, the second phase Phase-II, and the third phase Phase-III may be transmitted to the data driving unit 110.

The timing controller 130 transmits the signals for the first and second phase Phase-I and Phase-II to the data driving unit 110 during the horizontal blank HB of one horizontal period 1H, and transmits signals for the first and second phase Phase-I and Phase-II to the data driving unit 110 during a pulse section of the data enable signal DE.

The timing controller 130 transmits the preamble clock of a predetermined (or selected) frequency to the data driving unit 110 in the first phase Phase-I. The timing controller 130 performs the second phase Phase-II in response to a lock signal feedback inputted from the data driving unit 110 after outputting the preamble clock and transmits a control data packet CTRL to the data driving unit 110. The lock signal is generated from the data driving unit 110 and transmitted to the timing controller 130 when the phase of the internal clock recovered in the data driving unit 110 is fixed. The control data packet CTRL may include a data timing control signal, a MUX signal, a gate timing control signal, and the like.

The timing controller 130 performs a third phase Phase-III following the second phase Phase-II to transmit a pixel data packet RGB including pixel data of the input image to the data driving unit 110.

The timing controller 130 may transmit park data to the data driving unit 110 during a vertical blank period VB in a low speed driving mode. The data driving unit 110 converts the park data inputted from the timing controller 130 into a data voltage through a DAC in the low speed driving mode. The data voltage of the park data outputted from the data driving unit 110 may be applied to the pixel circuit of each of the sub-pixels through the data lines DL.

Figure 5:
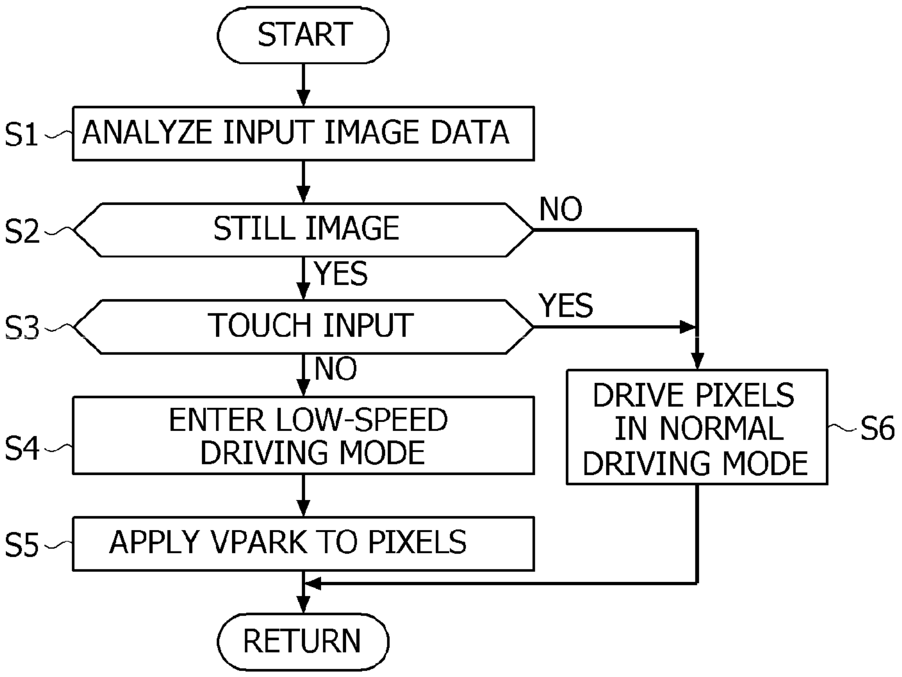
FIG. 5 is a flowchart illustrating a method of driving a display device according to an embodiment of the present disclosure.

FIG. 5 is a flowchart illustrating a method of driving a display device according to an embodiment of the present disclosure. In this driving method, the host system 200 and/or the timing controller 130 determine an input image and a touch input to select a driving mode. Hereinafter, the graphic processing unit of the host system 200 or the timing controller 130 may be interpreted as a control unit.

Referring to FIG. 5, the control unit analyzes input image data to determine whether the image data is a still image (S1 and S2). If the previous frame data stored in a memory and the currently input frame data are substantially the same, the control unit may determine as the still image. The control unit determines whether the still image continues for a predetermined (or selected) time or longer.

The control unit receives coordinate data of the touch input from the touch sensor driving unit to determine the touch input. The control unit enters a low-speed driving mode when no touch input is generated and still image data is input, and lowers the frame frequency to a frequency lower than the reference frame frequency (S3 and S4). The control unit controls the operation timing of the data driving unit 110 and the gate driving unit 120 based on the frame frequency in the low speed driving mode to lower the refresh rate of pixels. In the low speed driving mode, after pixel data is written to the pixels at predetermined (or selected) time intervals, the pixels do not receive new data for more than one frame period and maintain the previous data. In the low speed driving mode, park data may be inputted to the data driving unit 110 during a vertical blank period of a frame in which data is not inputted to the pixels. In the late driving mode, the refresh rate of pixels is lower than the reference frequency of the normal driving mode. In the low speed driving mode, the park voltage is applied to the pixels during the vertical blank period VB (S5).

When the input image is a moving image or a touch input is generated, the control unit controls the refresh rate of the pixels in the normal driving mode (S6). The control unit controls the operation timing of the data driving unit 110 and the gate driving unit 120 based on the reference frame frequency in the normal driving mode. In the normal driving mode, the pixel data is written to pixels for every frame period. In this case, the refresh rate is equal to the reference frame frequency. Accordingly, in the normal driving mode, the pixels are refreshed by receiving new pixel data for every frame period.

Figure 6:
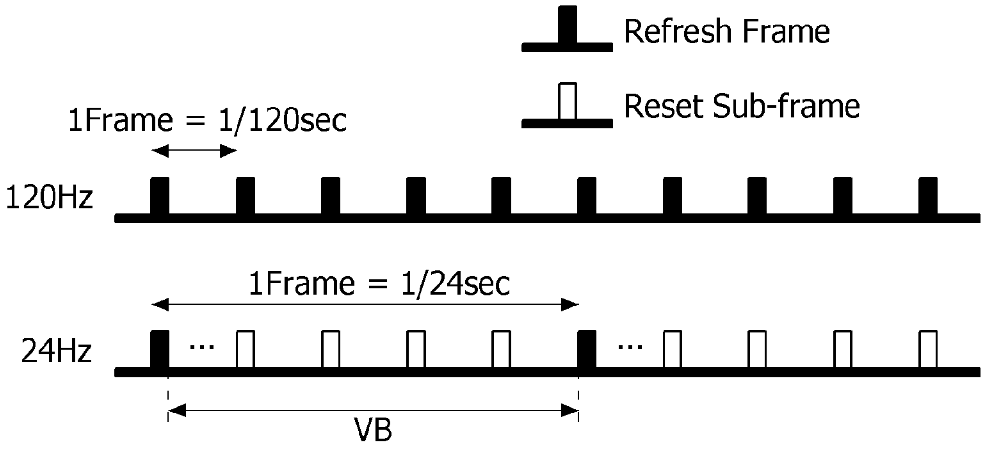
FIG. 6 is a diagram illustrating an example in which a frame frequency is varied in a normal driving mode and a low speed driving mode.

FIG. 6 is a diagram illustrating an example in which a frame frequency is varied in a normal driving mode and a low speed driving mode.

Referring to FIG. 6, the reference frame frequency set as the frame frequency in the normal driving mode may be set to 120 Hz. In this case, 1 frame period is 1/120 sec. In the normal driving mode, the data voltage of the pixel data is applied to the pixels for every frame period, so that the pixel data is written to the pixels. Hereinafter, a frame period in which the pixel data is written to the pixels is referred to as a "refresh frame" as shown in FIG. 6.

The frame frequency of the low speed drive mode may be lowered to 24 Hz. In this case, the refresh frame frequency is 1/24 Hz. Accordingly, the vertical blank period VB in which pixel data is not inputted between refresh frames in which pixel data is written to the pixels in the low speed driving mode is extended and lengthened compared to the normal driving mode. The vertical blank period VB between the Nth refresh frame and the N+1th refresh frame may be divided into a plurality of reset sub-frames in which a park voltage Vpark is applied to the data lines DL of the display panel 100 (N is a natural number)

After the pixel data is written to the pixels during the Nth reset frame period in the low speed driving mode, the pixel data is not written to the pixels during the subsequent vertical blank period VB and the previous data is maintained.

Figure 7:
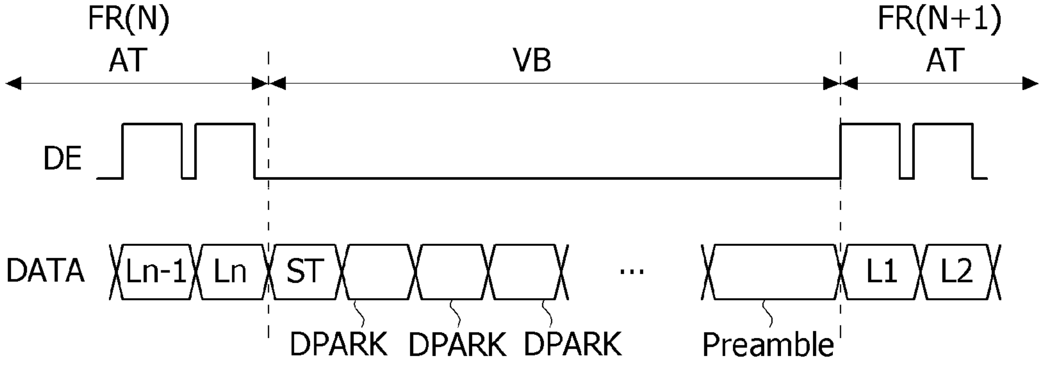
FIG. 7 is a diagram illustrating park data transmitted from a timing controller to a data driving unit in a low speed driving mode.

FIG. 7 is a diagram illustrating park data transmitted from a timing controller to a data driving unit in a low speed driving mode.

Referring to FIG. 7, the timing controller 130 transmits park data (Vpark value) to the data driving unit 110 during at least one vertical blank period VB in the low speed driving mode. The DAC of the data driving unit 110 converts the park data into a gamma compensation voltage and outputs the park voltage Vpark. In FIG. 7, "Ln−1" and "Ln" are data of the last pixel line and the previous pixel line of the Nth refresh frame period FR(N). "L1" and "L2" are data of the first and second pixel lines in the (N+1)th refresh frame period FR(N+1) resumed after the vertical blank period (VB). "Preamble" is preamble clock data.

The timing controller 130 may transmit a predetermined (or selected) start code ST to the data driving unit 110 before the park data DPARK. When the start code ST is detected in the data stream received during the vertical blank period VB in the low-speed driving mode, the data driving unit 110 samples the park data DPARK received after the detection of the start code ST and converts it into a park voltage Vpark.

Figure 8:
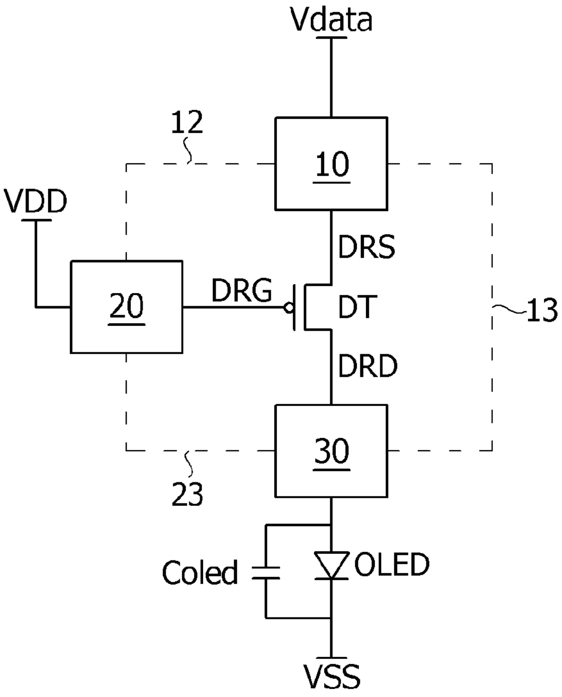
FIG. 8 is a diagram schematically showing a pixel circuit of the present disclosure.

FIG. 8 is a diagram schematically showing a pixel circuit of the present disclosure.

Referring to FIG. 8, the pixel circuit may include first to third circuit units 10, 20, and and first to third connection unit 12, 23, and 13. In these pixel circuits, one or more components may be omitted or added, and an external compensation circuit or an internal compensation circuit may be included.

The first circuit unit 10 supplies a data voltage Vdata to a driving element DT. The driving element DT may be implemented as a transistor including a gate DRG, a source DRS, and a drain DRD. The second circuit unit 20 receives a pixel driving voltage VDD and charges a capacitor Cst connected to the gate DRG of the driving element DT. The third circuit unit 30 provides a current flowing through the driving element DT to a light emitting element OLED. The light emitting element OLED converts current into light. The first connection unit 12 connects the first circuit unit 10 and the second circuit unit 20. The second connection unit 23 connects the second circuit unit 20 and the third circuit unit 30. The third connection unit 13 connects the third circuit unit 30 and the first circuit unit 10.

Figure 9:
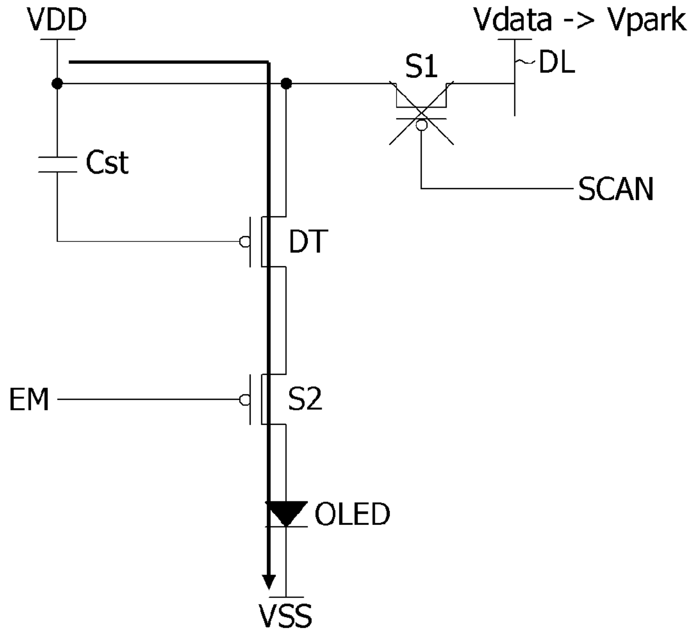
FIG. 9 is a circuit diagram showing the operation of a pixel circuit during an active interval in a low speed driving mode.
Figure 10:
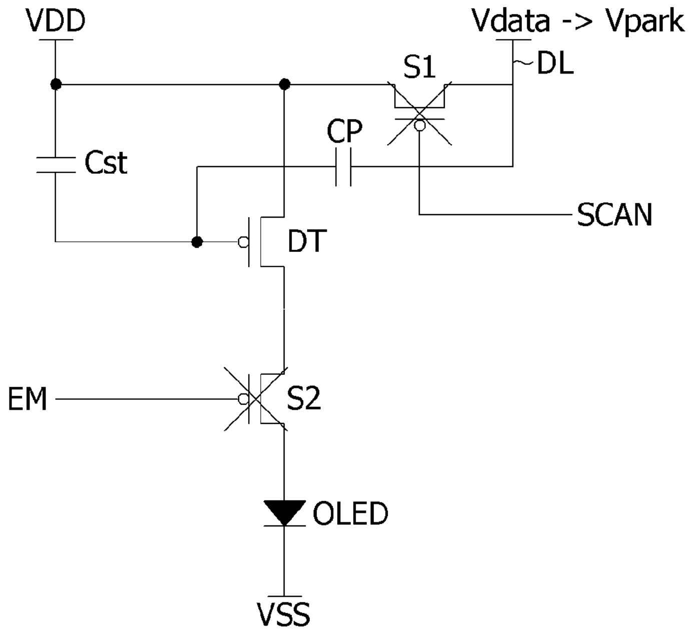
FIG. 10 is a circuit diagram showing the operation of a pixel circuit during a vertical blank period in a low speed driving mode.

FIG. 9 is a circuit diagram showing the operation of a pixel circuit during an active interval in a low speed driving mode. FIG. 10 is a circuit diagram showing the operation of a pixel circuit during a vertical blank period in a low speed driving mode.

Referring to FIGS. 9 and 10, the pixel circuit includes a driving element DT for driving a light emitting element OLED, and a first switch element S1 connected between a first electrode of the driving element DT and a data line DL, and a second switch element S2 for switching a current path between the driving element DT and the light emitting element OLED.

The first switch element S1 is turned on in response to a gate-on voltage VGL of a scan signal SCAN. The first switch element S1 is turned on according to the gate-on voltage VGL of the scan signal SCAN to connect the data line DL to the first electrode of the driving element DL. The second switch element S2 is turned on according to a gate-on voltage VEL of a EM signal EM. The second switch element S2 is turned on according to the gate-on voltage VEL of the EM signal EM to connect a second electrode of the driving element DT to an anode electrode of the light emitting element OLED.

The pixel circuit may be driven during an active interval AT in an initialization step, a sampling step, and a light emitting step. In the light emitting step, the first switch element S1 is turned off, and the second switch element S2 is turned on. As shown in FIG. 9, in the light emitting step, the current flows to the light emitting element OLED through the pixel driving voltage VDD, the driving element DT, and the second switch element S2. In the low speed driving mode, the data voltage Vdata of the pixel data is applied to the data line during the refresh frame period, and the park voltage Vpark is applied during the vertical blank period VB.

In the low speed driving mode, the park voltage Vpark is applied to the data line DL during at least one vertical blank period VB. The first and second switch elements S1 and S2 are in the off state during the vertical blank period VB. Accordingly, the park voltage Vpark is not directly applied to the driving element DT and the light emitting element OLED.

As shown in FIG. 10, the park voltage Vpark is applied to the gate of the driving element DT through a parasitic capacitor CP to suppress the fluctuation of the gate voltage of the driving element DT. Consequently, the present disclosure may stabilize the gate voltage of the driving element DT in the low-speed driving mode to prevent the luminance of pixels from changing.

Figure 11:
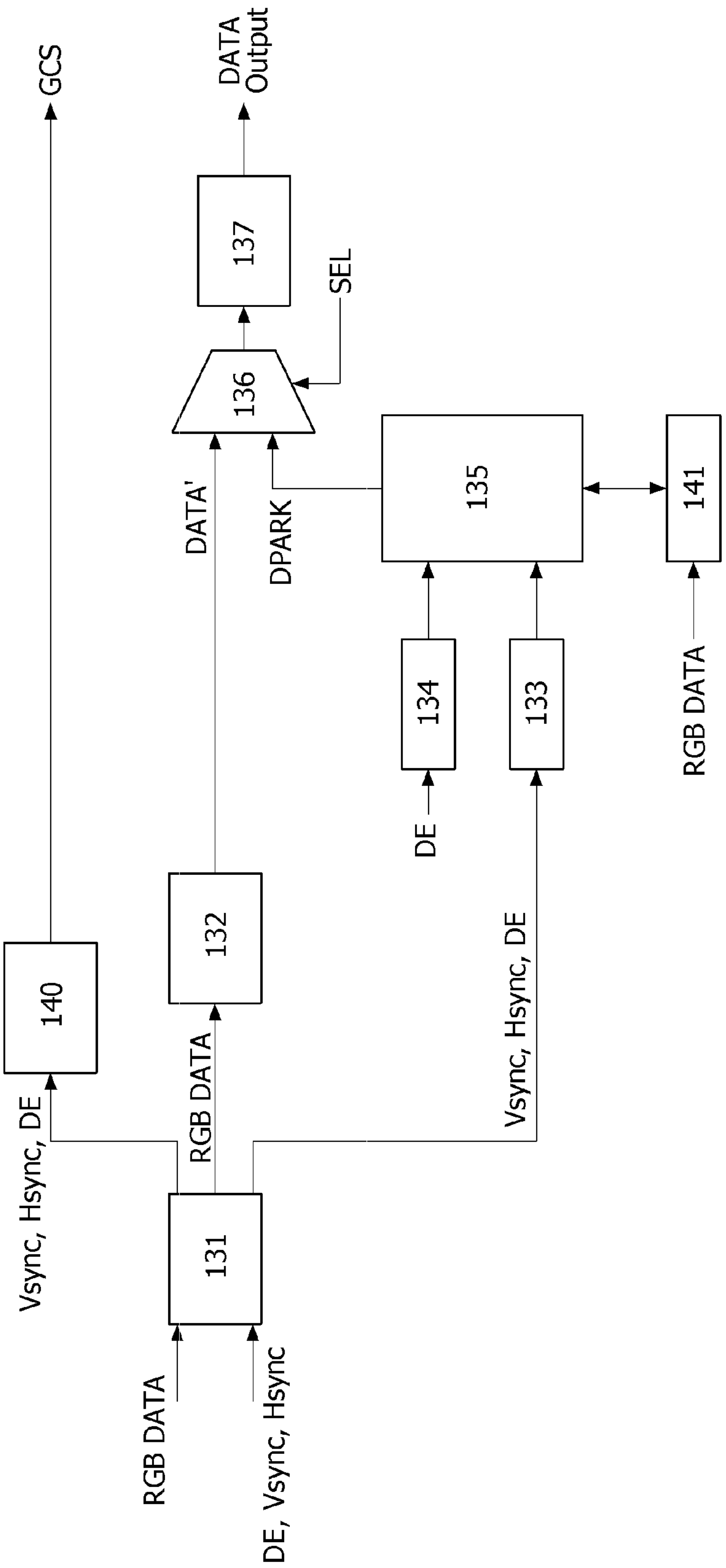
FIG. 11 is a block diagram showing a timing controller according to a first embodiment of the present disclosure.

FIG. 11 is a block diagram showing a timing controller 130 according to a first embodiment of the present disclosure.

Referring to FIG. 11, the timing controller 130 includes a data receiving unit 131, a data processing unit 132, a frame frequency determining unit 133, a position determining unit 134, a park data generating unit 135, a selection unit 136, and a data transmission unit 137. The timing controller 130 further includes a gate control unit 140 for outputting a gate timing control signal.

The data receiving unit 131 receives pixel data RGB DATA of an input image from the host system 200 and timing signals DE, Vsync, and Hsync synchronized with the data RGB DATA. The data receiving unit 131 may receive the pixel data RGB DATA and the timing signals DE, Vsync, and Hsync through a standard interface, for example, an embedded display port (eDP).

The data processing unit 132 supplies the pixel data RGB DATA to the selection unit 136. The data processing unit 132 may store the pixel data in a frame buffer 141, and rearrange the received pixel data RGB DATA according to the pixel arrangement on the display panel and the color arrangement of the sub-pixels to supply it to the selection unit 136.

The frame frequency determining unit 133 counts timing signals DE, Vsync, and Hsync to determine the frame frequency of currently input data. The host system 200 may lower the frame frequency in the low speed driving mode. Accordingly, the frame frequency determining unit 133 may determine whether the current driving mode is a normal driving mode or a low speed driving mode according to the frame frequency. The frame frequency determining unit 133 outputs a signal indicating the frame frequency.

The position determining unit 134 counts the data enable signal DE and determines at which position of the pixel array AA the currently input pixel data is written to the pixels. The position determining unit 134 outputs a signal indicating a pixel position in which the currently input pixel data is written.

The park data generating unit 135 receives an output signal from the frame frequency determining unit 133 and an output signal from the position determining unit 134. The park data generating unit 135 determines and outputs park data in a low speed driving mode based on frame frequency information and pixel position information in which pixel data is written.

The host system 200 may lower the frame frequency of the input image data and transmit it to the timing controller 130 in the low speed driving mode. The frame frequency of the low speed driving mode may be a specific frame frequency lower than the reference frame frequency, but the frequency may vary depending on the host system 200.

The park data generating unit 135 may determine the park data DPARK as a lower value as the frame frequency increases in the low speed driving mode. In this case, the park voltage Vpark is lowered.

The higher the pixel data value, the greater the data voltage Vdata applied to the pixel circuit. The park data generating unit 135 may determine the park data DPARK as a value proportional to the pixel data so that the park voltage Vpark increases as the pixel data value increases.

Figure 12:
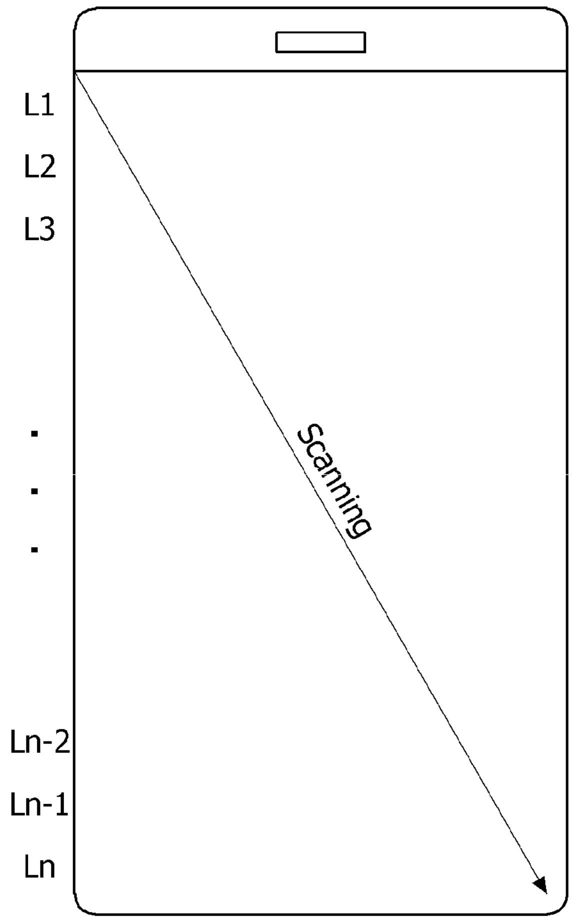
FIG. 12 is a diagram showing a pixel scanning direction and pixel lines.

As shown in FIG. 12, the park data generating unit 135 determines the park data DPARK as a higher value as the number of the pixel line increases when viewed from the pixel scanning direction as shown in FIG. 12. Thus, it is possible to compensate for an IR drop of the pixel driving voltage VDD in a pixel line having a late scanning order. In this case, the park voltage Vpark applied to the pixels of the nth pixel line Ln having a later scanning order may be higher than the park voltage Vpark applied to the pixels of the first pixel line L1.

The park data generating unit 135 may determine the park data DPARK as a frame representative value indicating a specific voltage value so that the same park voltage Vpark is applied to all pixels in the low speed driving mode. The frame representative value may be set as an average value of one frame data, but is not limited thereto.

The park voltage Vpark may be varied in units of sub-pixels, units of pixels, units of pixel lines, or units of frames by the park data DPARK. For example, the park data generating unit 135 may independently determine the park data for each of the pixels so that the park voltage Vpark may be applied as a data voltage charged to the pixel in the previous frame or a voltage slightly higher than the data voltage. Alternatively, the park data may be determined as a representative value in units of pixel lines based on an average value of line data to be written in pixels of one-pixel line.

The selection unit 136 selects a pixel data DATA' from the data processing unit 132 and the park data DPARK from the park data generating unit 135 in response to the selection signal SEL to provide it to the data transmission unit 137. The selection signal SEL has different logic values in the low speed driving mode and the normal driving mode. The selection signal SEL may be generated by the host system 200 or the frame frequency determining unit 133.

The selection unit 136 supplies pixel data from the data processing unit 132 to the data transmission unit 137 during an active interval AT for every frame period in the normal driving mode.

The selection unit 136 supplies the pixel data from the data processing unit 132 to the data transmission unit 137 during the active interval AT of the refresh frame period in the low speed driving mode. The selection unit 136 supplies the park data DPARK from the park data generating unit 135 to the data transmission unit 137 during at least one vertical blank period in the low speed driving mode.

The data transmission unit 137 transmits data DATA' and DPRAK from the selection unit 136 to the data driving unit 110 in a data transmission method conforming to the protocol of an interface for data communication between the timing controller 130 and the data driving unit 110, for example, an EPI interface protocol. The data driving unit 110 inputs the pixel data received through the EPI interface to the DAC to convert the pixel data into a data voltage Vdata and convert the park data DPARK into a park voltage Vpark.

The gate control unit 140 counts the timing signals DE, Vsync, and Hsync, to generate a gate timing control signal GCS with a preset (or selected) gate timing control value.

Figure 13:
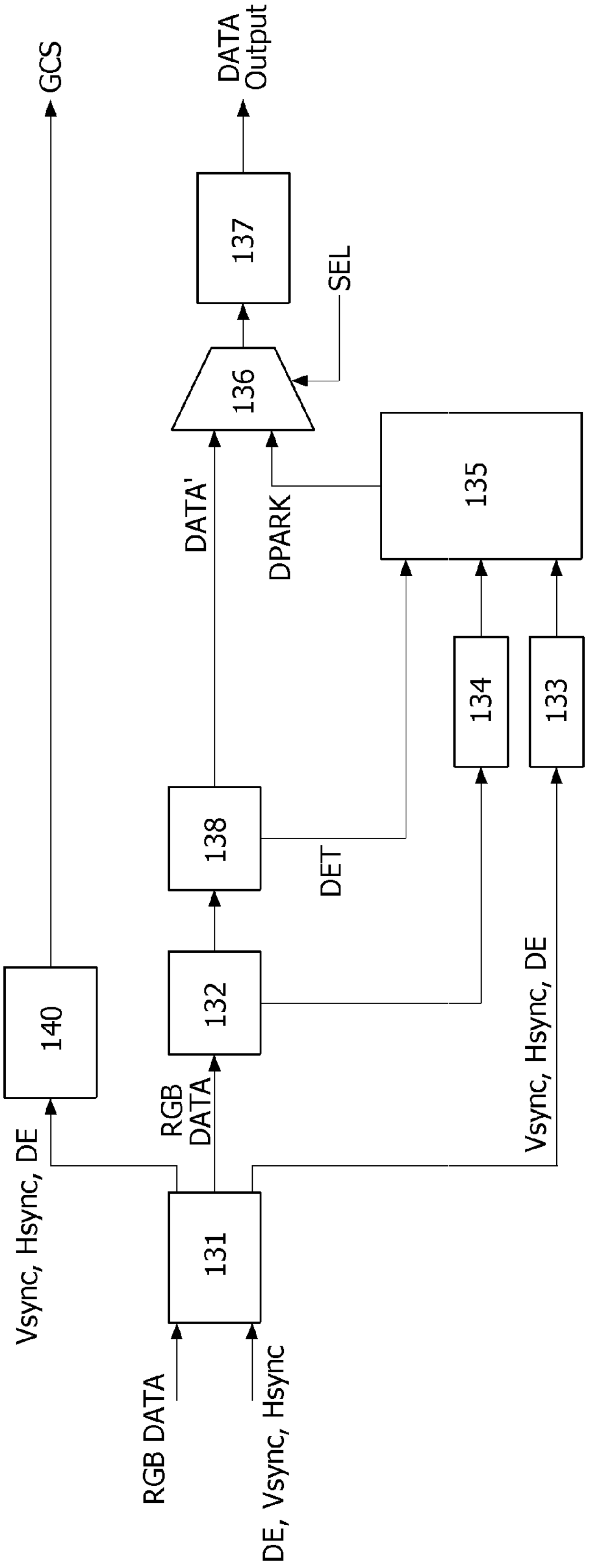
FIG. 13 is a block diagram showing a timing controller according to a second embodiment of the present disclosure.

FIG. 13 is a block diagram showing a timing controller according to a second embodiment of the present disclosure. In FIG. 13, the components that are substantially the same as those of the first embodiment are denoted by the same reference numerals, and detailed descriptions thereof are omitted.

Referring to FIG. 13, the timing controller 130 includes a data receiving unit 131, a data processing unit 132, a compensating unit 138, a frame frequency determining unit 133, a position determining unit 134, a park data generating unit 135, a selection unit 136, and a data transmission unit 137. The timing controller 130 further includes a gate control unit 140.

The data processing unit 132 may supply pixel data RGB DATA to the selection unit 136. The data processing unit 132 stores pixel data in the frame buffer 141, and rearrange the received pixel data RGB DATA according to the pixel arrangement of the display panel and the color arrangement of the sub-pixels to supply it to the compensating unit 138.

The compensation unit 138 sums the pixel data for each pixel for each of the pixels based on a predetermined (or selected) deterioration prediction model for each pixel to determines the amount of deterioration for each pixel according to the lapse of driving time for each pixel based on the summed cumulative value. The compensation unit 138 modulates pixel data by adding or multiplying a predetermined (or selected) compensation value to pixel data based on the amount of deterioration of a pixel by the deterioration prediction model to compensate for deterioration of pixels. Accordingly, an afterimage of the display device may be prevented and the lifetime of the display device may be extended.

The compensation unit 138 provides deterioration amount data DET indicating the amount of deterioration for each pixel to the park data generating unit 135.

The park data generating unit 135 receives frame frequency information from the frame frequency determining unit 133, pixel position information from the position determining unit 134, and information on the amount of deterioration for each pixel from the compensation unit 138. The park data generating unit 135 determines the park data DPARK based on the frame frequency information, the pixel position information, and the information on the amount of deterioration for each pixel.

The park data generating unit 135 may determine the park data DPARK as a lower value as the frame frequency increases in the low speed driving mode. The park data generating unit 135 may determine the park data DPARK as a value proportional to the pixel data so that the park voltage Vpark increases as the pixel data value increases. In addition, the park data generating unit 135 may determine the park data as a higher value in the pixel line in which the scanning order is late in order to increase the park voltage Vpark in a pixel line with a later scanning order compared to a pixel line with an earlier scanning order.

In the low speed driving mode, the pixel data is written to all pixels for each refresh frame. One frame data including pixel data corresponding to all pixels in the refresh frame is input to the timing controller 130. The park data generating unit 135 may determine the park data DPARK as a frame representative value so that the same park voltage Vpark is applied to all pixels in the low speed driving mode. The frame representative value may be determined as an average value of one frame data.

The park data generating unit 135 may independently determine the park data for each of the pixels so that the park voltage Vpark may be applied as a data voltage charged to the pixel in the previous frame or a voltage slightly higher than the charged data voltage. In addition, the park data may be determined as a representative value in units of pixel lines based on an average value of line data to be written in pixels of one-pixel line.

The park data generating unit 135 may increase the park data value as the pixel deterioration amount increases in each of the pixels based on the pixel deterioration amount information to increase the park voltage Vpark.

Figure 14:
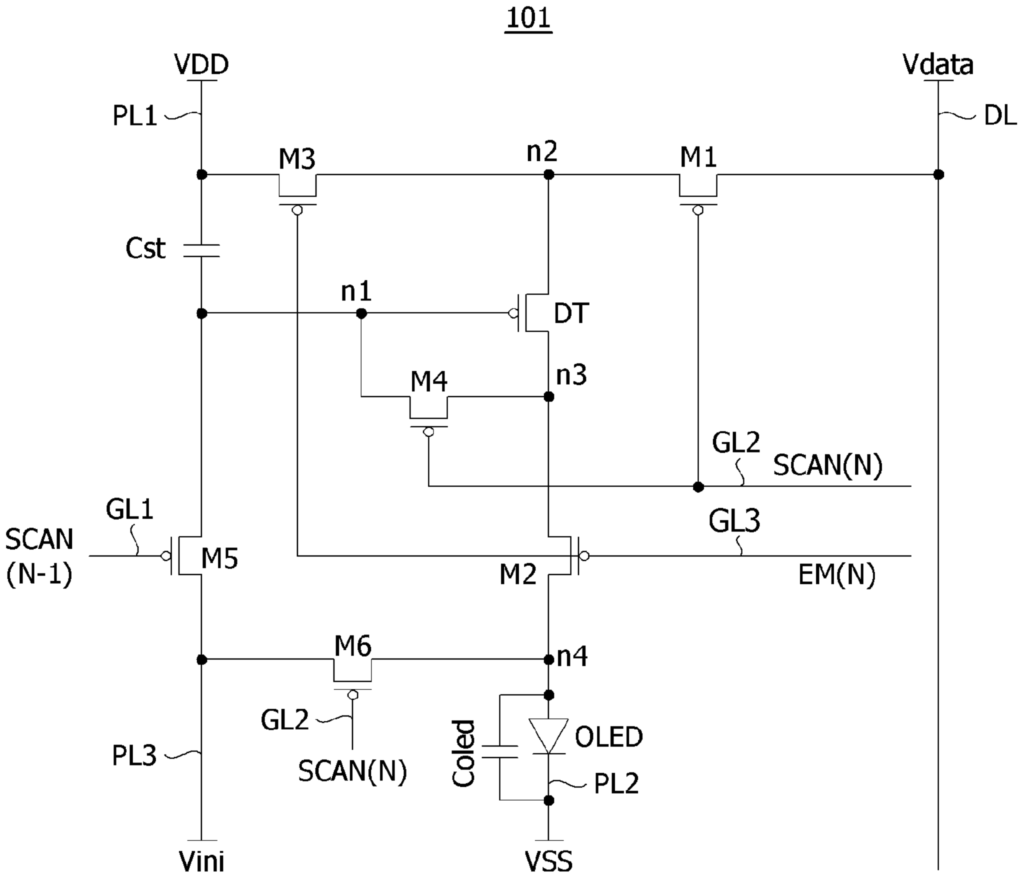
FIG. 14 is a circuit diagram showing in detail a pixel circuit according to a first embodiment of the present disclosure.

FIG. 14 is a circuit diagram showing a pixel circuit according to a first embodiment of the present disclosure.

Referring to FIG. 14, the pixel circuit includes a light emitting element OLED, a driving element DT, a plurality of switch elements M1 to M6, a capacitor Cst, and the like. The driving element DT and the switch elements M1 to M6 may be implemented as a p-channel switch element.

A pixel driving voltage VDD is supplied to the pixel circuit through a VDD line PL1. A low-potential power supply voltage VSS is commonly supplied to the pixel circuit of the pixels through a VSS line PL2. An initialization voltage Vini is commonly supplied to the pixel circuit of the pixels through a Vini line PL3. The pixel circuit is supplied with a gate signal such as an N−1th scan signal SCAN(N−1), an Nth scan signal SCAN(N), and an EM signal EM(N). The N−1th scan signal SCAN(N−1) is synchronized with a data voltage Vdata of the N−1th pixel line. The Nth scan signal SCAN(N) is synchronized with the data voltage Vdata of the Nth pixel line. The pulse of the Nth scan signal SCAN(N) is generated with the same pulse width as the N−1th scan signal SCAN(N−1), and generated later than the pulse of the N−1th scan signal SCAN(N−1).

The driving element DT drives the light emitting element OLED by controlling a current flowing through the light emitting element OLED according to a gate-source voltage Vgs. The driving element DT includes a gate electrode connected to a first node n1, a first electrode connected to a second node n2, and a second electrode connected to a third node n3. The first node n1 is connected to the capacitor Cst, the gate electrode of the driving element DT, and the first electrode of a fourth switch element M4. The second node n2 is connected to the first electrode of the first switch element M1 and the second electrode of the third switch element M3. The third node n3 is connected to the second electrode of the driving element DT, the second electrode of the fourth switch element M4, and the first electrode of the second switch element M2.

An anode electrode AND of the light emitting element OLED is connected to the fourth node n4, and a cathode electrode CAT is connected to the VSS line PL2 to which the low-potential power supply voltage VSS is applied. The fourth node n4 is connected to the anode electrode AND of the light emitting element OLED, the second electrode of the second switch element M2, and the second electrode of the sixth switch element M6. The light emitting element OLED may include a capacitor formed between the anode electrode AND and the cathode electrode CAT.

The capacitor Cst is connected between the VDD line PL1 and the first node n1.

The first switch element M1 is turned on according to a gate-on voltage VGL of the Nth scan signal SCAN(N) to connect a data line DL to the second node n2. The first switch element M1 includes a gate electrode connected to a second gate line GL2 to which the Nth scan signal SCAN(N) is applied, a first electrode connected to the second node n2, and a second electrode connected to the data line DL.

The second switch element M2 is turned on according to a gate-on voltage VEL of the EM signal EM(N) to connect the third node n3 to the fourth node n4. The gate electrode of the second switch element M2 is connected to a third gate line GL3 to which the EM signal EM(N) is applied. The first electrode of the second switch element M2 is connected to the third node n3, and the second electrode of the second switch element M2 is connected to the fourth node n4.

The third switch element M3 is turned on according to the gate-on voltage VEL of the EM signal EM(N) to connect the VDD line PL1 to the first electrode of the driving element DT. The third switch element M3 includes a gate electrode connected to the third gate line GL3, a first electrode connected to the VDD line PL1, and a second electrode connected to the second node n2.

The fourth switch element M4 is turned on according to the gate-on voltage VGL of the Nth scan signal SCAN(N) to connect the first node n1 and the third node n3. The fourth switch element M4 includes a gate electrode connected to the second gate line GL2, a first electrode connected to the first node n1, and a second electrode connected to the third node n3.

Since the fourth switch element M4 is turned on only very short 1 horizontal period 1H in which the Nth scan signal SCAN(N) is generated as the gate-on voltage VGL during one frame period, the fourth switch element M4 maintains a turned-off state for approximately 1 frame period. Accordingly, a leakage current may be generated through the fourth switch element M4. In order to suppress the leakage current of the fourth switch element M4, the fourth switch element M4 may be implemented as a transistor having a dual gate structure in which two transistors are connected in series.

The fifth switch element M5 is turned on according to the gate-on voltage VGL of the N−1th scan signal SCAN(N−1) to connect the first node n1 to the Vini line PL3. The fifth switch element M5 includes a gate electrode connected to the first gate line GL1 to which the N−1th scan signal SCAN(N−1) is applied, a first electrode connected to the first node n1, and a second electrode connected to the Vini line PL3. In order to suppress the leakage current of the fifth switch element M5, the fifth switch element M5 may be implemented as a transistor having a dual gate structure in which two transistors are connected in series.

The sixth switch element M6 is turned on according to the gate-on voltage VGL of the Nth scan signal SCAN(N) to connect the Vini line PL3 to the fourth node n4. The sixth switch element M6 includes a gate connected to the second gate line GL2, a first electrode connected to the Vini line PL3, and a second electrode connected to the fourth node n4.

Figure 15A:
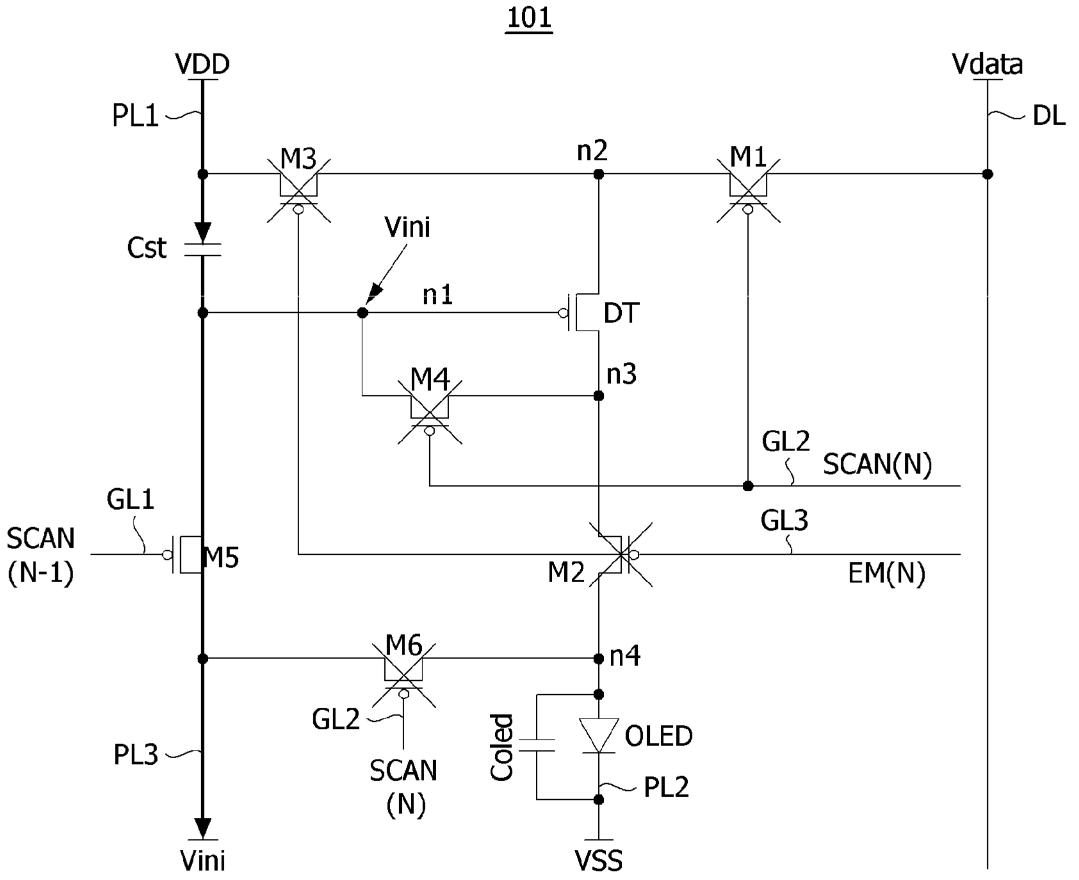
FIGS. 15A to 17B are diagrams showing stepwise the operation of the pixel circuit shown in FIG. 14.
Figure 15B:
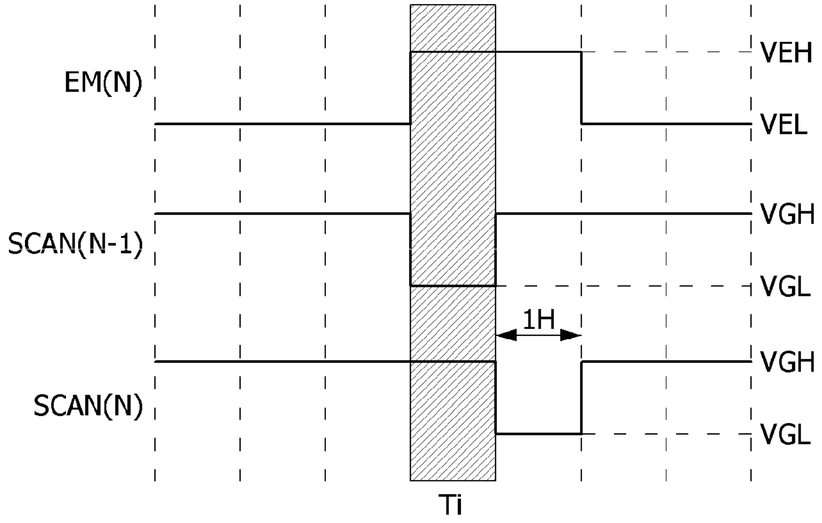
Figure 16A:
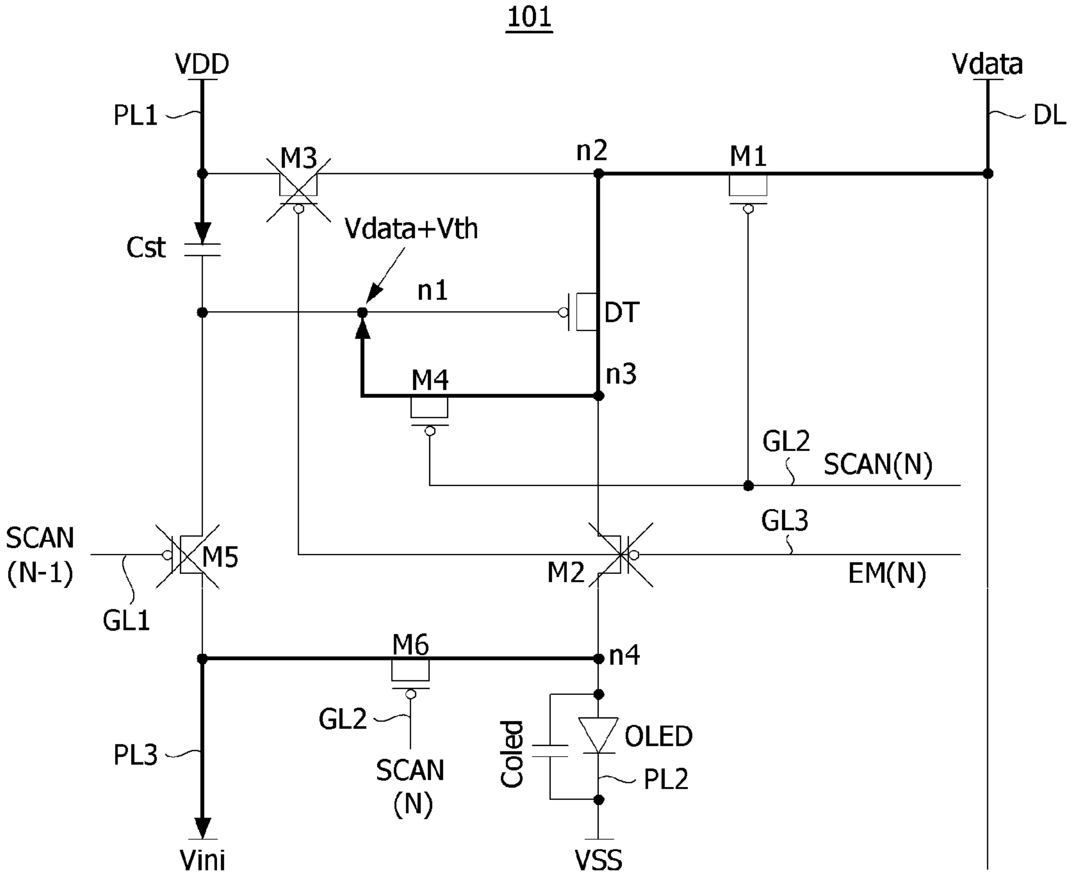
Figure 16B:
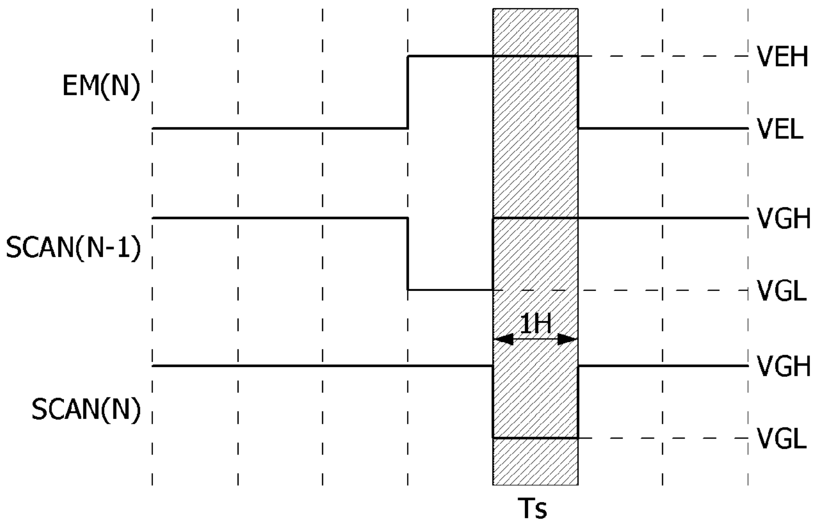
Figure 17A:
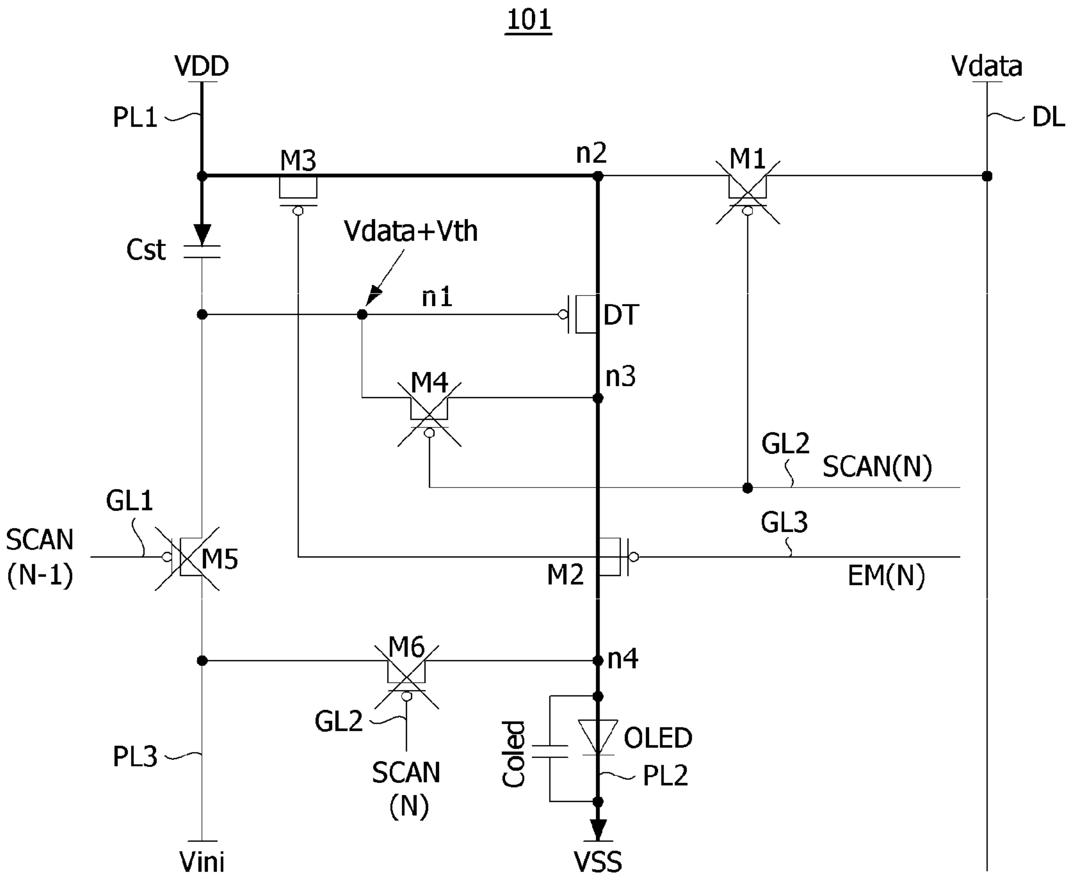
Figure 17B:
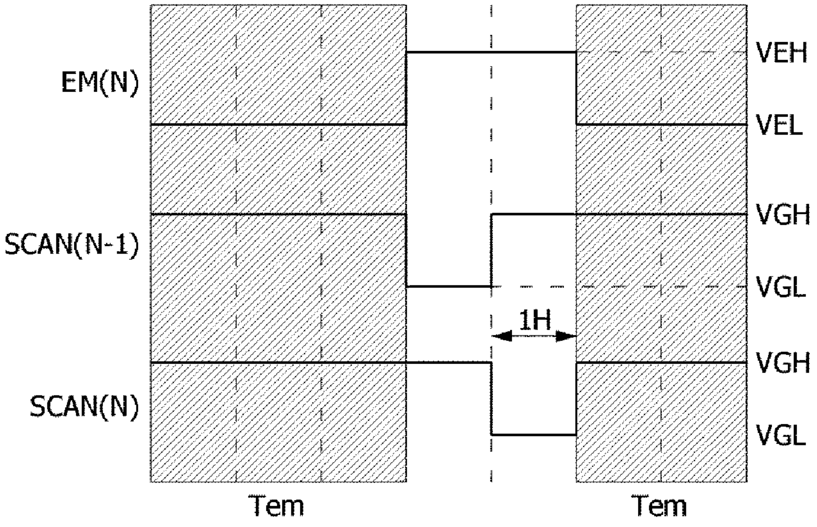

FIGS. 15A to 17B are diagrams showing stepwise the operation of the pixel circuit shown in FIG. 14. FIG. 15A is a circuit diagram showing a current path flowing through a pixel circuit in an initialization step Ti. FIG. 16A is a circuit diagram showing a current path flowing in the pixel circuit in a sampling step Ts. FIG. 17A is a circuit diagram showing a current path flowing in a pixel circuit in a light emitting step Tem. FIGS. 15B, 16B, and 17B are waveform diagrams showing a gate signal applied to the pixel circuit shown in FIG. 14. In FIGS. 15A, 16A and 17A, the arrows indicate the current flow in the pixel circuit.

Referring to FIGS. 15A and 15B, the voltage of the N−1th scan signal SCAN(N−1) in the initialization step Ti is the gate-on voltage VGL. In the initialization step Ti, the Nth scan signal SCAN(N) and the EM signal EM(N) are the gate-off voltage VEH. The fifth switch element M5 is turned on according to the gate-on voltage VGL of the N−1th scan signal SCAN(N−1) in the initialization step Ti to discharge the first node n1 to an initialization voltage Vini. In this case, the first node n1 is initialized.

Referring to FIGS. 16A and 16B, the voltage of the Nth scan signal SCAN(N) in the sampling step Ts is the gate-on voltage VGL. In the sampling step Ts, the N−1th scan signal SCAN(N−1) and the EM signal EM(N) are gate-off voltages VGH/VEH. The first and second switch elements M1 and M2 are turned on according to the gate-on voltage VGL of the Nth scan signal SCAN(N) in the sampling step Ts. In the sampling step Ts, the data voltage Vdata is applied to the second node n2, and the voltage of the first node n1 changes to Vdata+Vth. "Vth" is a threshold voltage of the driving element DT. Consequently, in the sampling step Ts, the threshold voltage Vth of the driving element DT is sampled and charged in the first node n1.

Referring to FIGS. 17A and 17B, in the light emitting step Tem, the voltage of the EM signal EM(N) is the gate-on voltage VGL. In the light emitting step Tem, the N−1th and Nth scan signals SCAN(N−1) and SCAN(N) are the gate-off voltage VGH. The second and third switch elements M2 and M3 are turned on according to the gate-on voltage VEL of the EM signal EM(N) in the light emitting step Tem. During the light emitting step Tem, a current flows through the driving element DT to the light emitting element OLED, so that the light emitting element OLED may be emit light. The current flowing in the light emitting element OLED is adjusted according to the gate-source voltage Vgs of the driving element DT. The gate-source voltage Vgs of the driving element DT is Vgs=Vdata+Vth−VDD during the light emitting step Tem.

During the vertical blank period VB, the switch elements M1 to M6 are in an off state. In the low speed driving mode, the park voltage Vpark is applied to the data line DL during at least one vertical blank period VB to stabilize the gate voltage of the driving element DT.

Figure 18:
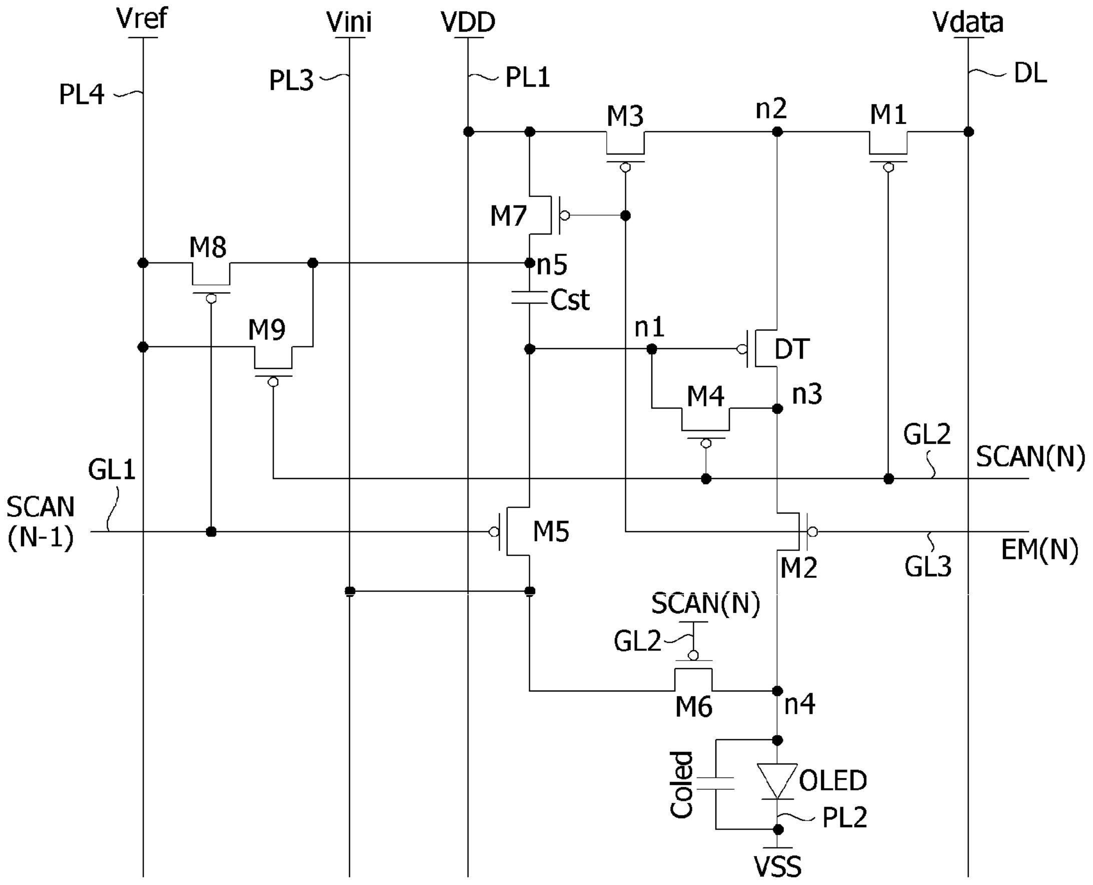
FIG. 18 is a circuit diagram showing a pixel circuit according to a second embodiment of the present disclosure.
Figure 19:
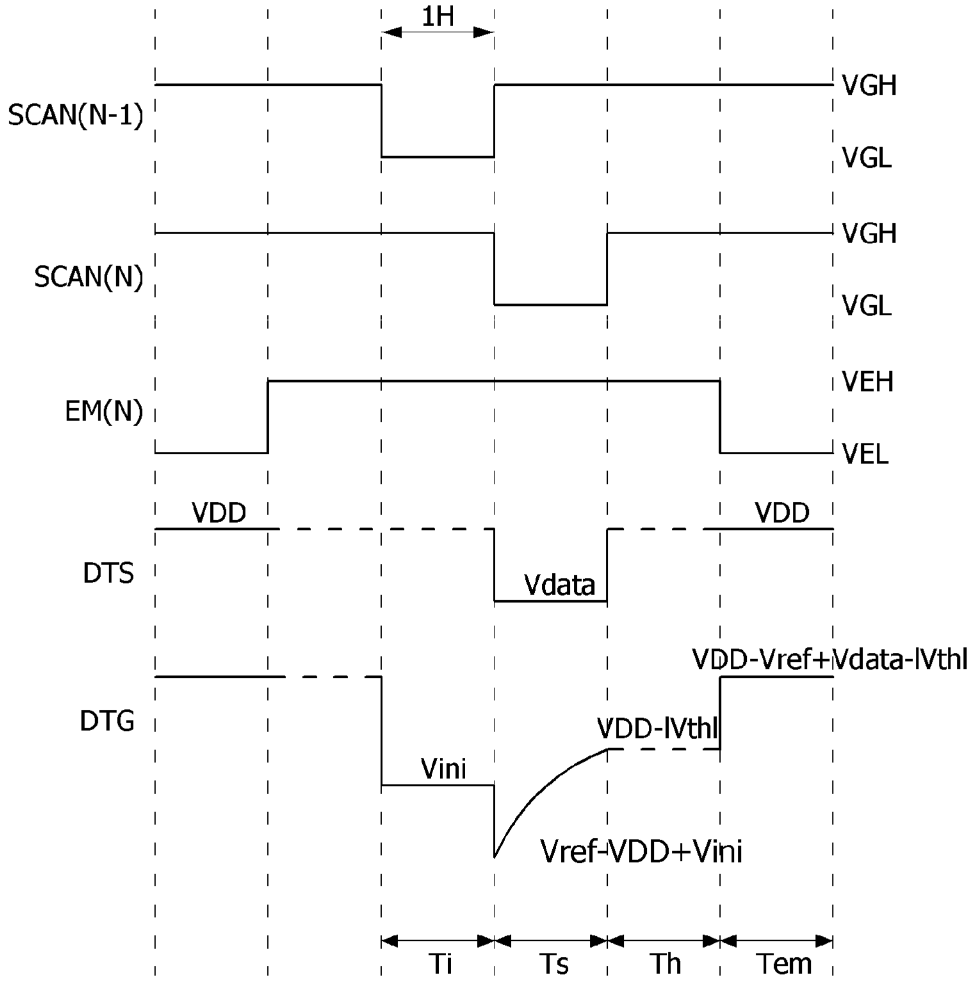
FIG. 19 is a waveform diagram showing a method of driving the pixel circuit shown in FIG. 18.

FIG. 18 is a circuit diagram showing a pixel circuit according to a second embodiment of the present disclosure. FIG. 19 is a waveform diagram showing a method of driving the pixel circuit shown in FIG. 18.

Referring to FIGS. 18 and 19, the pixel circuit includes a light emitting element OLED, a driving element DT, a plurality of switch elements M1 to M9, a capacitor (Cst), and the like. The driving element DT and the switch elements M1 to M9 may be implemented as a p-channel switch element.

The driving element DT drives the light emitting element OLED by controlling a current flowing to the light emitting element OLED according to the gate-source voltage Vgs. The driving element DT includes a gate electrode connected to the first node n1, a first electrode connected to the second node n2, and a second electrode connected to the third node n3.

The anode electrode AND of the light emitting element OLED is connected to the fourth node n4, and the cathode electrode CAT is connected to the VSS line PL2 to which the low-potential power supply voltage VSS is applied. The light emitting element OLED may include a capacitor Coled formed between the anode electrode AND and the cathode electrode CAT.

The capacitor Cst is connected between the VDD line PL1 and the first node n1.

The first switch element M1 is turned on according to the gate-on voltage VGL of the Nth scan signal SCAN(N) to connect the data line DL to the second node n2. The second switch element M2 is turned on according to the gate-on voltage VEL of the EM signal EM(N) to connect the third node n3 to the fourth node n4. The third switch element M3 is turned on according to the gate-on voltage VEL of the EM signal EM(N) to connect the VDD line PL1 to the first electrode of the driving element DT. The EM signal EM(N) is supplied to the pixel circuit through the third gate line GL3.

The fourth switch element M4 is turned on according to the gate-on voltage VGL of the Nth scan signal SCAN(N) to connect the first node n1 and the third node n3. The Nth scan signal SCAN(N) is supplied to the pixels P through the second gate line GL2. In order to suppress the leakage current of the fourth switch element M4, the fourth switch element M4 may be implemented as a transistor having a dual gate structure in which two transistors are connected in series.

The fifth switch element M5 is turned on according to the gate-on voltage VGL of the N−1th scan signal SCAN(N−1) to connect the first node n1 to the Vini line PL3. The fifth switch element M5 includes a gate electrode connected to the first gate line GL1, a first electrode connected to the first node n1, and a second electrode connected to the Vini line PL3. The N−1th scan signal SCAN(N−1) is supplied to the pixel circuit through the first gate line GL1. In order to suppress the leakage current of the fifth switch element M5, the fifth switch element M5 may be implemented as a transistor having a dual gate structure in which two transistors are connected in series.

The sixth switch element M6 is turned on according to the gate-on voltage VGL of the Nth scan signal SCAN(N) to connect the Vini line PL3 to the fourth node n4. The sixth switch element M6 includes a gate connected to the second gate line GL2, a first electrode connected to the Vini line PL3, and a second electrode connected to the fourth node n4.

The seventh switch element M7 is turned on according to the gate-on voltage VEL of the EM signal EM(N) to connect the VDD line PL1 to the fifth node n5. The gate electrode of the seventh switch element M7 is connected to the third gate line GL3 to which the EM signal EM(N) is applied. The first electrode of the seventh switch element M7 is connected to the VDD line PL1, and the second electrode is connected to the fifth node n5. The fifth node n5 is connected to the capacitor Cst, the second electrode of the seventh switch element M7, the second electrode of the eighth switch element M8, and the second electrode of the ninth switch element M9. The seventh switch element M7 is turned on in the light emitting step Tem to apply the pixel driving voltage VDD to the first node n1 so that the gate-source voltage of the driving element DT is set to Vref−Vdata. Thus, according to the present disclosure, since the current flowing to the light emitting element OLED through the driving element DT in the light emitting step Tem using the seventh switch element M7 is not affected by the pixel driving voltage VDD, luminance deviation due to the IR drop of the pixel driving voltage VDD may be prevented.

The eighth switch element M8 is turned on in the initialization step Ti according to the gate-on voltage VGL of the N−1th scan signal SCAN(N−1) to connect a reference voltage line PL4 to which the reference voltage Vref is applied to the fifth node n5. The gate electrode of the eighth switch element M8 is connected to the first gate line GL1 to which the N−1th scan signal SCAN(N−1) is applied. The first electrode of the eighth switch element M8 is connected to the Vref line PL4, and the second electrode is connected to the fifth node n5.

The ninth switch element M9 is turned on according to the gate-on voltage VGL of the Nth scan signal SCAN(N) to connect the reference voltage line PL4 to which the reference voltage Vref is applied to the fifth node n5 in the sampling step Ts. The gate electrode of the ninth switch element M9 is connected to the second gate line GL2 to which the Nth scan signal SCAN(N) is applied. The first electrode of the ninth switch element M9 is connected to the reference voltage line PL4, and the second electrode is connected to the fifth node n5.

The eighth and ninth switch elements M8 and M9 maintain the voltage of the fifth node n5 as the reference voltage Vref in the initialization step Ti and the sampling step Ts.

The pixel circuit samples a threshold voltage Vth of the driving element DT in real time in each of the sub-pixels to compensate for the data voltage Vdata by the threshold voltage Vth. In the case of this pixel circuit, since the reference voltage Vref is applied to the first capacitor Cst, even if the capacitor Cst becomes a short circuit in the manufacturing process, a dark spot is defective, and thus the image quality is not adversely affected. The pixel circuit shown in FIG. 18 may directly apply the voltage of the data line DL to the driving element DT to sample the threshold voltage Vth of the driving element DT and compensate for the IR drop of the pixel driving voltage VDD to improve the luminance deviation according to the screen position.

Figure 20A:
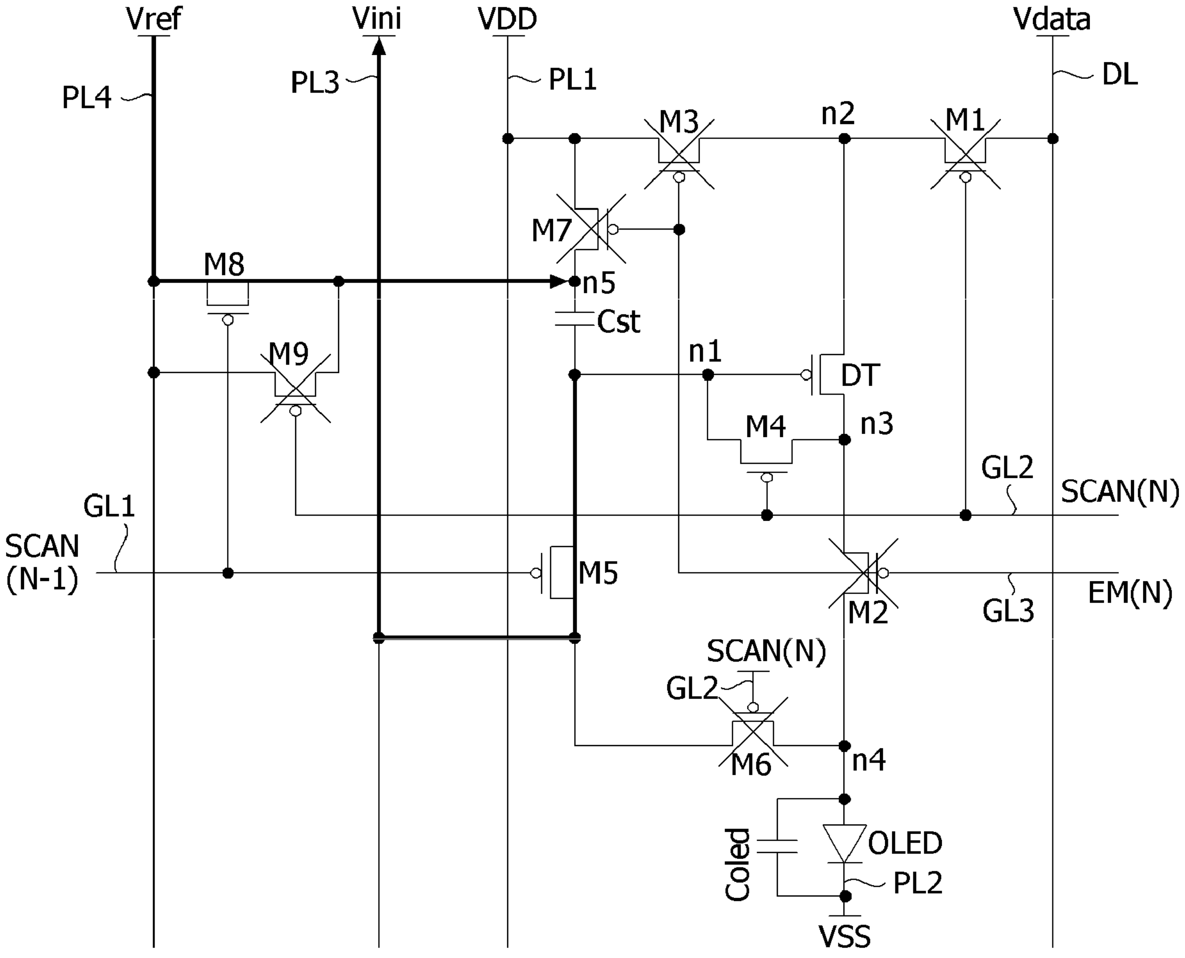
FIGS. 20A to 20C are circuit diagrams showing stepwise driving of the pixel circuit shown in FIG. 18.
Figure 20B:
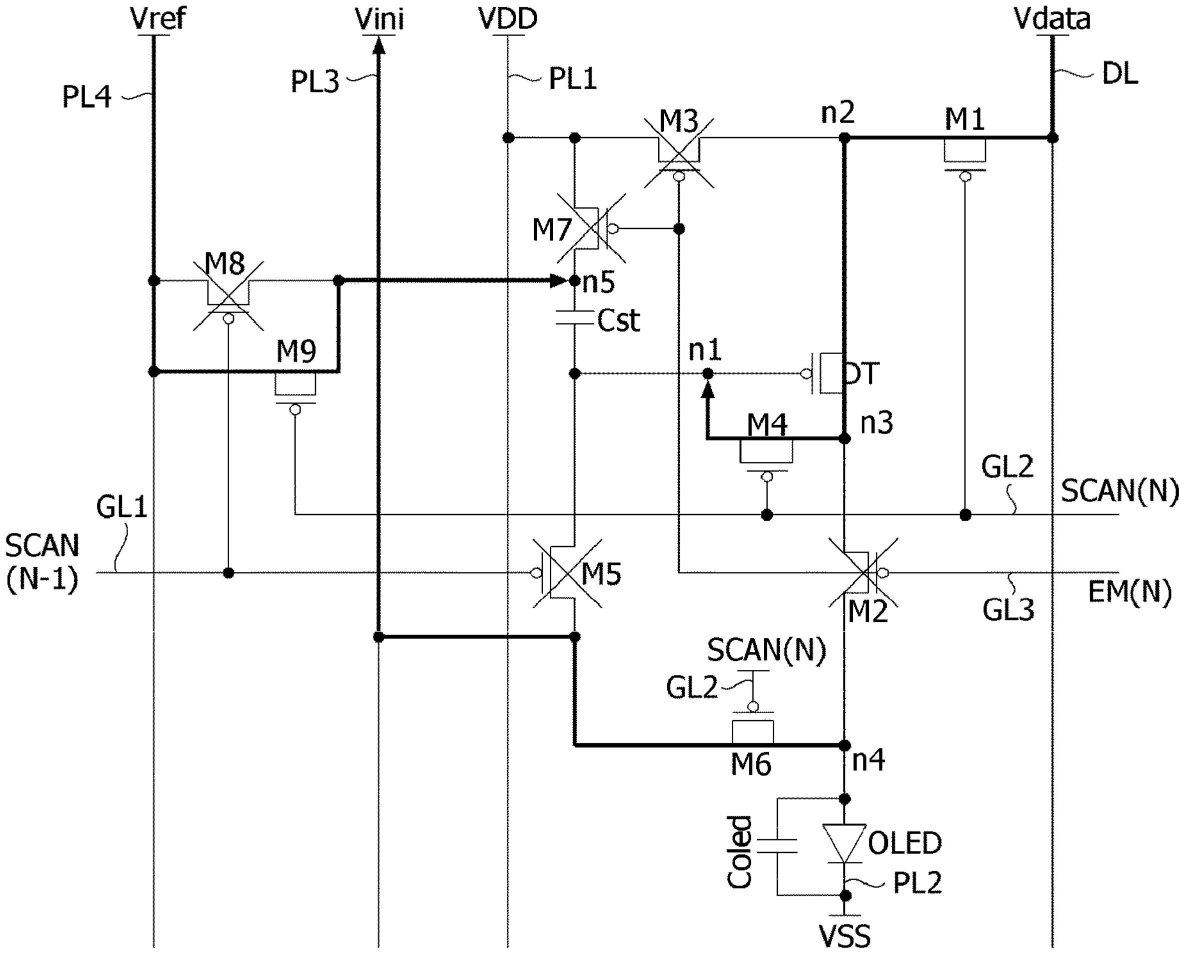
Figure 20C:
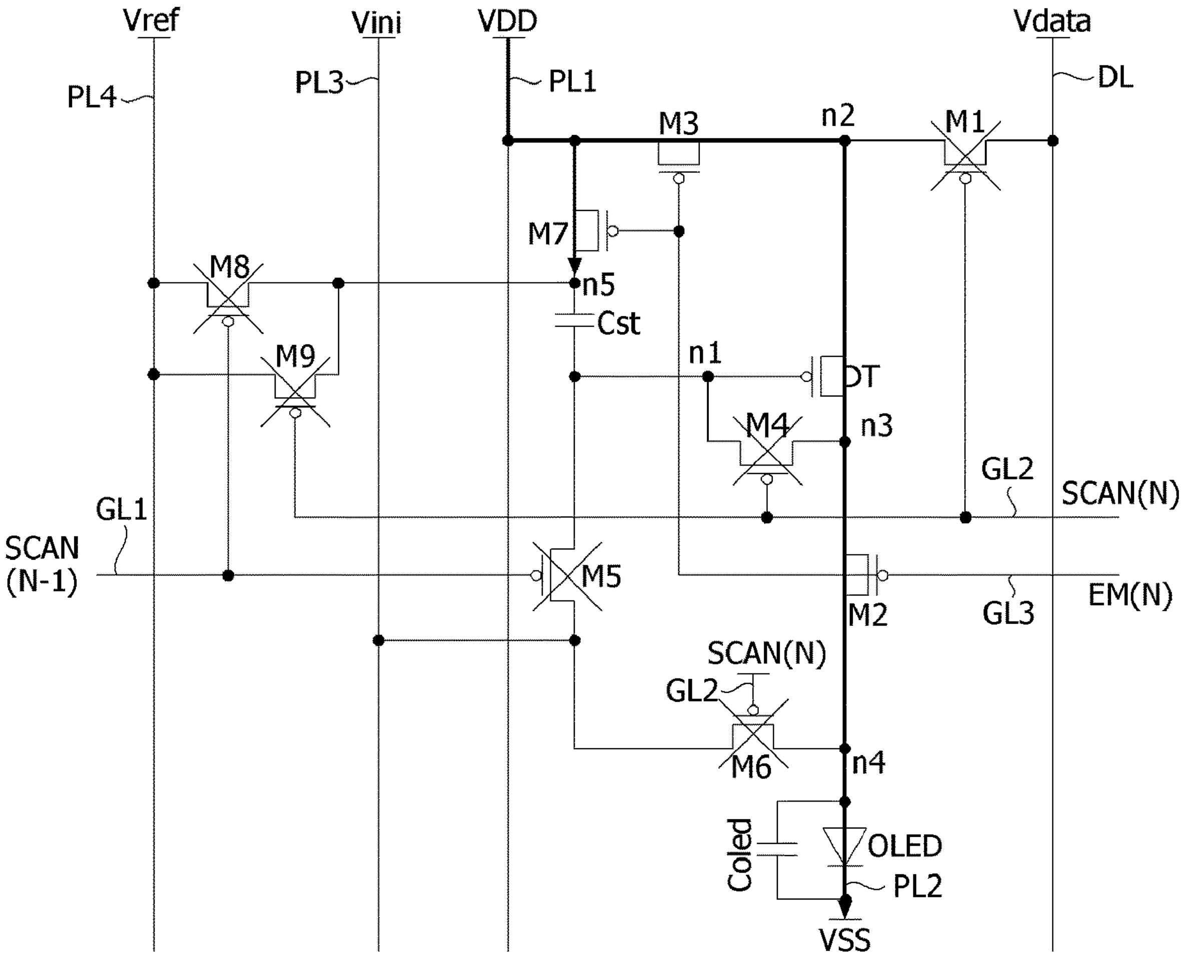

FIGS. 20A to 20C are circuit diagrams showing stepwise driving of the pixel circuit shown in FIG. 18. FIG. 20A is a circuit diagram showing a current path flowing in the pixel circuit shown in FIG. 18 in the initialization step Ti. FIG. 20B is a circuit diagram showing a current path flowing in the pixel circuit shown in FIG. 18 in the sampling step Ts. FIG. 20C is a circuit diagram showing a current path flowing in the pixel circuit shown in FIG. 18 in the light emitting step Tem. A holding step Th may be set between the sampling step Ts and the light emitting step Tem. In the holding step, all switch elements of the pixel circuit are turned off, so that main nodes of the pixel circuit may be floated.

Referring to FIGS. 19 and 20A, in the initialization step Ti, the N−1th scan signal SCAN(N−1) is generated as a pulse of a gate-on voltage VGL. In this case, the Nth scan signal SCAN(N) and the Nth EM signal EM(N) maintain the gate-off voltage VGH/VEH. Accordingly, in the initialization step Ti, the fifth and eighth switch elements M5 and M8 are turned on, while the remaining switch elements M1 to M4, M6, M7, and M9 are maintained in an off state.

The sampling step Ts of the N−1th pixel line and the initialization step Ti of the N−1th pixel line are simultaneously generated by the N−1th scan signal SCAN(N−1). The N−1th scan signal SCAN(N−1) is synchronized with the data voltage Vdata to be written to the sub-pixel of the N−1th pixel line, so that the data voltage Vdata is supplied to the first node n1 of the sub-pixel arranged on the N−1th pixel line. At the same time, the N−1th scan signal SCAN (N−1) supplies the pixel driving voltage VDD to the fifth node n5 in sub-pixels of the Nth pixel line.

In the initialization step Ti, the voltage of the second node n2, that is, the first electrode voltage of the driving element DT, is a floating state because the second and third switch elements M2 and M3 are in the off state. The voltage of the first node n1 is initialized to the initialization voltage Vini because the fifth switch element M5 is turned on in the initialization step Ti. The voltage of the fifth node n5 is the pixel driving voltage VDD because the eighth switch element M8 is turned on in the initialization step Ti.

Referring to FIGS. 19 and 20B, in the sampling step Ts, the Nth scan signal SCAN(N) is generated as a pulse of the gate-on voltage VGL, and a data voltage Vdata to be written to the sub-pixels of the Nth pixel line is output from the data driving unit 110. In this case, the N−1th scan signal SCAN (N−1) is inverted to the gate-off voltage VGH, and the Nth EM signal EM(N) maintains the gate-off voltage VEH. Accordingly, in the sampling step Ts, the first, fourth, sixth and ninth switch elements M1, M4, M6 and M9 are turned on, while the remaining switch elements M2, M3, M5, M7 and M8 are maintained in an off state.

In the sampling step Ts of the Nth pixel line, the data voltage Vdata to be written to the sub-pixel of the Nth pixel line is synchronized with the pulse of the Nth scan signal SCAN(N), so that it supplied to the second node n2 of the sub-pixel arranged on the Nth pixel line.

In the sampling step Ts, the fourth switch element M4 is turned on to connect the gate electrode and the second electrode of the driving element DT. Since the first node n1 and the third node n3 are connected through the fourth switch element M4 in the sampling step Ts, when the gate voltage DTG of the driving element DT increases and reaches the absolute value (|Vth|) of the threshold voltage Vth of the driving element DT, the driving element DT is turned off. Accordingly, in the sampling step Ts and the holding step Th, Vref−(Vdata−|Vth|) is stored in the first capacitor Cst so that the threshold voltage Vth of the driving element DT is sampled. The fourth switch element M4 is turned off in the light emitting step Tem and maintains the off state so that the current flowing through the driving element DT flows to the light emitting element OLED.

In the sampling step Ts, the voltage DTS of the second node n2 is the data voltage Vdata because the first switch element M1 is turned on and the third switch element M3 is in the off state. The voltage of the first node n1, that is, the gate voltage DTG of the driving element DT, changes from Vref−VDD+Vini to Vdata−|Vth| in the sampling step Ts. In the sampling step Ts, the voltage of the fifth node n5 is lowered from VDD to Vref by applying the reference voltage Vref through the eighth switch element M8. In the sampling step Ts, the voltage of the first node n1 drops as much as the voltage of the fifth node n5 falls from VDD to Vref through capacitor coupling when the fifth switch element M5 is turned off. Thus, the voltage of the first node n1 is lowered to Vref−VDD+Vini and then changed to Vdata−|Vth|.

In the holding step Th, the gate signals SCAN(N−1), SCAN(N), and EM(N) maintain the gate-off voltage VGH so that all switch elements M1 to M9 maintain the off-state. In this case, the main nodes n1 to n5 of the pixel circuit are floating, so that the threshold voltage sensing operation of the driving element DT may continue.

Referring to FIGS. 19 and 20C, the Nth EM signal EM(N) is inverted to the gate-on voltage VEL in the light emitting step Tem. In this case, the scan signals SCAN(N−1) and SCAN(N) maintain the gate-off voltage VGH. Accordingly, in the light emitting step Tem, the second, third, and seventh switch elements M2, M3, and M7 are turned on, while the remaining switch elements M1, M4, M5, M6, M8, and M9 maintain the off-state.

In the light emitting step Tem, the voltages of the first and fifth nodes n1 and n5 are changed to VDD due to the pixel driving voltage VDD supplied through the third and ninth switch elements M2 and M9. The voltage of the first node n1, that is, the gate voltage DTG of the driving element DT, is changed to VDD−Vref+Vdata−|Vth| in the light emitting step Tem. In the light emitting step Tem, the current $I_{OLED}$ of the light emitting element OLED is not affected by the threshold voltage Vth of the driving device DT as shown in an equation below, and thus, a slight change in the driving element DT or a deviation of the threshold voltage Vth between pixels is compensated, and is not affected by a change in the pixel driving voltage VDD due to an IR drop of the pixel driving voltage VDD.

$$I_{OLED} = \frac{K}{2}(Vgs + |Vth|)^2 = K(Vg - Vs + |Vth|)^2 = K(VDD - Vref + VDD - |Vth| - VDD + |Vth|)^2 = K(Vdata - |Vth|)^2$$

Herein, K is a proportional constant determined by charge mobility, parasitic capacitance, and channel capacitance of the driving element DT. Vgs is the voltage between the gate and source of the driving element DT.

The first gate driving unit 121 shifts the scan signal and supplies it to the scan lines using a first shift register that sequentially shifts the scan signal according to the shift clock timing. Similarly, each of the second gate driving units 122 shifts the EM signal and supplies it to the EM lines using a second shift register that sequentially shifts the EM signal according to the shift clock timing.

During the vertical blank period VB, the switch elements M1 to M9 are in an off state. In the low speed driving mode, the park voltage Vpark is applied to the data line DL during at least one vertical blank period VB to stabilize the gate voltage of the driving element DT.

The technical benefits to be achieved by the present disclosure, the means for achieving the benefits, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a pixel array in which a plurality of data lines, a plurality of gate lines overlapping the data lines, and a plurality of pixels are arranged;

a data driving circuit configured to convert pixel data to a data voltage and convert park data to a park voltage;

a gate driving circuit configured to sequentially supply gate signals to the respective gate lines; and a timing controller configured to transmit the park data to the data driving circuit, wherein each of the pixels includes sub-pixels having different colors, wherein the gate signal includes a scan signal and a light emitting control signal, each of the sub-pixels includes:

a light-emitting element;

a driving element for driving the light-emitting element by supplying current to the light-emitting element; and is operative when a first switch element turned on based on a gate-on voltage of the scan signal to couple the data line to a first electrode of the driving element, and during a time when the first switch element is turned off, the park voltage is applied to the data lines, and wherein the park voltage is applied to all pixels of the pixel array at a same voltage.

2. The display device of claim 1, wherein each of the sub-pixels further includes:

a second switch element turned on based on a gate-on voltage of the light emitting control signal to couple a second electrode of the driving element to an anode electrode of the light emitting element, when the second switch element is turned off, the park voltage is applied to the data lines.

3. The display device of claim 1, wherein the timing controller configured to:

control a refresh rate of the pixels at a reference frame frequency in a normal driving mode and the refresh rate of the pixels at a frequency lower than the reference frame frequency in a low speed driving mode, and transmit the park data to the data driving circuit during at least one vertical blank period in the low speed driving mode.

4. The display device of claim 1, wherein the data voltage and the park voltage are supplied to the data lines.

5. The display device of claim 1, wherein the timing controller is configured to determine the park data in one of a sub-pixel unit of a display panel, a pixel unit of the display panel, a pixel line unit of the display panel, and a frame data unit.

6. The display device of claim 1, wherein the timing controller is configured to determine the park data based on a pixel position to which the pixel data is written and a frame frequency of the low speed driving mode.

7. The display device of claim 1, wherein the timing controller is configured to determine the park data based on at least one of a pixel position to which the pixel data is written, a frame frequency of the low speed driving mode, and an amount of deterioration of each of the pixels.

8. The display device of claim 7, wherein the timing controller is configured to transmit a selected start code to the data driving circuit prior to the park data.

9. The display device of claim 1, wherein the park voltage is generated as a lower voltage as a frame frequency increases in the low speed driving mode.

10. The display device of claim 9, wherein the timing controller determines the park data based on an average value of one frame data.

11. The display device of claim 1, wherein the timing controller determines the pixel data as an average value of line data to be written to pixels of one-pixel line.

12. A display device, comprising:

a pixel array in which a plurality data lines, a plurality of gate lines overlapping the data lines, and a plurality of pixels are arranged;

a data driving circuit configured to convert pixel data to a data voltage and convert park data to a park voltage;

a gate driving circuit configured to sequentially supply gate signals to the respective gate lines; and a timing controller configured to transmit the park data to the data driving circuit, wherein each of the pixels includes sub-pixels having different colors, wherein the gate signal includes a scan signal and a light emitting control signal, each of the sub-pixels includes:

a light-emitting element;

a driving element for driving the light-emitting element by supplying current to the light-emitting element; and is operative when a first switch element turned on based on a gate-on voltage of the scan signal to couple the data line to a first electrode of the driving element, and during a time when the first switch element is turned off, the park voltage is applied to the data lines, wherein the park voltage is applied to the pixels at a voltage set in units of pixel lines of the display panel.

13. A method of driving a display device including a pixel array in which a plurality of data lines, a plurality of gate lines overlapping the data lines, and a plurality of pixels are arranged, comprising:

controlling a refresh rate of the pixels at a reference frame frequency in a normal driving mode;

controlling a refresh rate of the pixels at a frequency lower than the reference frame frequency in a low speed driving mode;

transmitting park data to a data driving circuit in the low speed driving mode;

converting the park data to a park voltage;

supplying the park voltage to the data lines, turning a switch element that is electrically connected to a corresponding data line of the plurality of data lines into an off state;

applying the park voltage to the plurality of pixels while the switch element that is electrically connected to a corresponding data line in each of the pixels is in the off state, wherein the park voltage is applied to all pixels of the pixel array at a same voltage.

14. The method of claim 13, further comprising:

applying the park voltage to the pixels at a higher voltage as the value of the pixel data increase.

15. The method of claim 13, further comprising:

applying the park voltage to the pixels at a data voltage previously charged in the pixels or a voltage higher than the data voltage.

* * * * *